(12) United States Patent
Shimoda et al.

(10) Patent No.: US 6,840,017 B1
(45) Date of Patent: Jan. 11, 2005

(54) VIBRATION CONTROL STRUCTURE

(75) Inventors: Ikuo Shimoda, Tokyo (JP); Kiyoharu Suzuki, Tokyo (JP)

(73) Assignee: Oiles Corporation, Tokyo (JP)

( * ) Notice: Subject to any disclaimer, the term of this patent is extended or adjusted under 35 U.S.C. 154(b) by 87 days.

(21) Appl. No.: 10/168,799

(22) PCT Filed: Oct. 24, 2000

(86) PCT No.: PCT/JP00/07432

§ 371 (c)(1),
(2), (4) Date: Jun. 24, 2002

(87) PCT Pub. No.: WO02/35033

PCT Pub. Date: May 2, 2002

(51) Int. Cl.[7] .............................................. E04G 23/02
(52) U.S. Cl. ......................... 52/167.1; 52/1; 52/167.7; 52/167.8
(58) Field of Search .......................... 52/167.1, 167.4, 52/1, 167.6, 167.7, 167.8

(56) References Cited

U.S. PATENT DOCUMENTS

| | | | |
|---|---|---|---|
| 2,690,074 A | | 9/1954 | Jones |
| 5,349,794 A | * | 9/1994 | Taga ........................... 52/167.1 |
| 5,732,802 A | | 3/1998 | Tsukagoshi |
| 5,740,652 A | * | 4/1998 | Inoue et al. ................. 52/745.1 |
| 6,037,403 A | * | 3/2000 | Katase et al. ................ 524/579 |
| 6,141,919 A | | 11/2000 | Robinson |
| 6,354,047 B1 | * | 3/2002 | Shimoda et al. ............ 52/167.1 |
| 6,457,284 B1 | * | 10/2002 | Isoda ........................ 52/167.1 |
| 6,601,350 B1 | * | 8/2003 | Isoda ........................ 52/167.1 |

FOREIGN PATENT DOCUMENTS

| | | |
|---|---|---|
| JP | 54-28226 | 9/1979 |
| JP | 2-1947 | 1/1990 |
| JP | 10-46865 | 2/1998 |
| JP | 11-2229632 A | 8/1999 |
| JP | 2000-73607 | 3/2000 |
| JP | 2000-73612 | 3/2000 |
| JP | 2000-129933 | 5/2000 |
| JP | 2000-220318 A | 8/2000 |
| WO | WO 97/25550 | 7/1997 |
| WO | 00-12843 A1 | 3/2000 |
| WO | 00-74362 A1 | 3/2000 |

* cited by examiner

*Primary Examiner*—Brian E. Glessner
*Assistant Examiner*—Basil Katcheves
(74) *Attorney, Agent, or Firm*—Nixon & Vanderhye

(57) ABSTRACT

A building (1) includes square columns (2) disposed in such a manner as to extend in a vertical direction so as to support the vertical load of the building (1); girders (3) disposed in such a manner as to bridge the square columns (2) and extend in the horizontal direction between the square columns (2); variation damping means (6) juxtaposed to opposing side surfaces (4) and (5) of each square column (2) on each floor of the building (1); and upper and lower connecting means (7) and (8) for connecting the vibration damping means (6) to a ceiling girder (3) side and a floor girder (3) side, respectively.

24 Claims, 18 Drawing Sheets

VIBRATION CONTROL STRUCTURE

This application is the U.S. national phase of international application PCT/JP00/07432 filed Oct. 24, 2000, which designated the U.S.

TECHNICAL FIELD

The present invention relates to a vibration-damped structure in which the lateral (horizontal) deformation and vibration of columns supporting the vertical load of a structure such as a building due to an earthquake, winds, traffic vibrations, and the like are decreased as quickly as possible, and the vibration of the structure is thereby damped.

BACKGROUND ART

To damp as quickly as possible the lateral (horizontal) vibration of a structure such as a building for businesses or offices, a multiple dwelling house, and a detached house, which serve as buildings, as well as a bridge, an abutment, and the like due to an earthquake, winds, traffic vibrations, and the like, vibration dampers such as lead dampers, viscous dampers, steel rod dampers, and the like are used. However, since such vibration dampers are, in many cases, disposed between the structure and the ground, the vibration dampers have a problem in that they are difficult to be applied to existing structures.

On the other hand, so-called vibration isolating walls in which damper such as those described above are installed in walls of the structure can be easily applied to an existing structure. However, with such vibration isolating walls, regardless of whether the structure is newly constructed or is an existing one, in a case where a necessary number of walls for obtaining the vibration damping effect in application are not present, there arises a need to install new walls within the structure to partition the interior of the structure into small units. In addition, in places which are to be used as passages for connecting together rooms of the structure, the new walls cannot be installed. In this respect, the degree of freedom of installation is restricted.

In addition, in the case of a vibration damper in which a resistance plate is disposed in a box member, a viscous material is filled in the gap between the box member and the resistance plate, and the viscous material is adapted to be sheared by the relative displacement of the resistance plate with respect to the box member so as to absorb the relative displacement energy by the shearing of the viscous material, large angular moment occurs in the box member and the resistance plate in the relative displacement. Hence, there is a need to firmly connect the box member and the resistance plate to the structure so as to be able to withstand this large angular moment.

Generally, since the connecting structure is arranged such that the box member and the resistance plate are connected to the structure by using a multiplicity of bolts and steel plates having substantial thickness, a large space is occupied by this connecting structure. Hence, the space for installing the box member and the resistance plate is substantially restricted, and the size of the rooms of the structure is limited. In particular, since tensile and compressive forces based on the bending moment are particularly concentrated on lateral end portions of the box member and the resistance plate, unless their strength is sufficient, there is the possibility of occurrence of localized buckling there. From the viewpoint of preventing this localized buckling as well, the connecting structure becomes large, and the space for installing the box member and the resistance plate which demonstrate the damping performance becomes limited. In addition, since the area of the resistance plate becomes small, the capability of the vibration damper declines, and there is a possibility that the rooms of the structure are made small due to the jutting out of the large connecting structure in antiplane directions.

The present invention has been devised in view of the above-described aspects, and its object is to provide a vibration-damped structure which has sufficient withstanding force with a connecting structure whose occupying space is small without needing to partition the interior of the structure into small units and without being restricted by the passage space regardless of whether the structure is newly constructed or is an existing one, and which is capable of damping as quickly as possible the lateral deformation and vibration of columns due to an earthquake, winds, traffic vibrations, and the like, to thereby damp the vibration of the structure.

DISCLOSURE OF INVENTION

The vibration-damped structure in accordance with a first aspect of the invention comprises: a column for supporting the vertical load of a structure; a vibration damping means juxtaposed to a side surface of said column; and upper and lower connecting means for connecting said vibration damping means to a ceiling girder side and a floor girder side, respectively, said vibration damping means including a box member having an opening at its upper portion and a bottom wall plate at its lower portion and connected at said bottom wall plate to said floor girder side by means of said lower connecting means; a resistance plate extending in and outside said box member through the opening of said box member and connected at its portion located outside said box member to said ceiling girder side by means of said upper connecting means; and a viscous material filled in a gap between said box member and a portion of said resistance plate located within said box member, and said box member having a pair of wide side wall plates secured to said bottom wall plate, one of said wide side wall plates being disposed such that its wide surface opposes the side surface of said column with a gap.

According to the vibration-damped structure in accordance with the first aspect, since the vibration damping means is juxtaposed to the side surface of the column for supporting the vertical load of the structure, it is possible to damp as quickly as possible the lateral deformation and vibration of the column due to an earthquake, winds, traffic vibrations, and the like, thereby making it possible to damp the vibration of the structure. Moreover, the vibration damping means can be installed without needing to partition the interior of the structure into small units for the vibration damping means and without being restricted by the passage space, and a structure whose vibration is suitably damped can be provided.

In the invention, the structure includes a building for businesses or offices, a multiple dwelling house, and a detached house, which serve as buildings, as well as a bridge, an abutment, and the like. In addition, in a case where the vibration damping means is disposed at a portion of a column between a foundation and a floor girder on the foundation, the foundation is regarded as the floor girder side, while the floor girder on the foundation is regarded as the ceiling girder side, wherein the vibration damping means is connected on one side to the foundation side by means of the lower connecting means, and is connected on the other side to the floor girder side by means of the upper connecting means. The invention also includes such a connecting form.

In the invention, quadrangular columns are generally used as the columns, but the invention is not necessarily limited to the same, and polygonal columns having fixed wide areas may be used. Further, the invention is not limited to angular columns, and circular columns or elliptical columns may be used. In addition, as the viscous material, a high-viscosity material may be used which exhibits satisfactory viscous shearing resistance in shearing and does not undergo a change in its characteristics over a long period of time.

In the invention, the lower connecting means in one aspect includes a box member-side gusset plate secured to the bottom wall plate of the box member; a floor girder-side gusset plate disposed within a vertical plane substantially identical to that of the box member-side gusset plate and secured on the floor girder side; lower splicing plate means disposed in face-to-face relation to the box member-side gusset plate and the floor girder-side gusset plate, respectively; and high-strength bolts for fastening the lower splicing-plate means to both the box member-side gusset plate and the floor girder-side gusset plate. According to such a lower connecting means, the box member can be firmly secured to the floor girder side with sufficient withstanding force via the bottom wall plate. In addition, the antiplane width (thickness) can be made small, and the projecting width from the column can be made narrow, so that the interior of the structure is prevented from becoming narrow.

In the above-described lower connecting means, the lower splicing-plate means may be formed by being comprised of at least one pair of lower splicing plates for clamping each of the box member-side gusset plate and the floor girder-side gusset plate, and the pair of lower splicing plates may be arranged to pressingly clamp each of the box member-side gusset plate and the floor girder-side gusset plate by tightening forces of the high-strength bolts.

In the invention, the lower splicing-plate means may be frictionally connected in one plane to each of the box member-side gusset plate and the floor girder-side gusset plate, but the lower splicing-plate means may be formed by the pair of lower splicing plates for clamping the box member-side gusset plate and the floor girder-side gusset plate as described above, and the lower splicing-plate means may be frictionally connected in two planes to the box member-side gusset plate and the floor girder-side gusset plate. By virtue of this two-plane friction type connection, the box member can be fixed very firmly to the floor girder side, and even if a large horizontal force and angular moment are applied to the box member and the resistance plate in the relative horizontal displacement between the box member and the resistance plate at the time of an earthquake or the like, it is possible to sufficiently withstand the shearing force and the tensile force based on them. Moreover, even if the number of the high-strength bolts is halved, it is possible to realize firm fixation equivalent or superior to the one-plane friction type connection, and it is possible to obtain a compact joining structure.

In the invention, at least one of the pair of lower splicing plates may be formed of a high-friction steel plate disposed such that its high-friction surface is in contact with the box member-side gusset plate and the floor girder-side gusset plate. Here, as the high-friction steel plate, it is possible to particularly cite as a preferable example a steel plate having irregularities formed on its joining surface. As a more preferable example, it is possible to cite a high-friction steel plate having a high friction surface exhibiting high frictional resistance mainly against the vertical force. By using the lower splicing plate formed of such a high-friction steel plate, it is possible to efficiently and desirably secure the withstanding force against the horizontal force and the bending moment at low cost.

The lower connecting means in another aspect of the invention further includes a pair of lower-side-end upper flange plates respectively secured to horizontal opposite ends of the bottom wall plate of the box member and the box member-side gusset plate and having a vertical length longer than the vertical length of the box member-side gusset plate; and a pair of lower-side-end lower flange plates respectively secured to horizontal opposite ends of the floor girder-side gusset plate and having a vertical length longer than the vertical length of the floor girder-side gusset plate, and a lower end face of the lower-side-end upper flange plate abuts against an upper end face of the corresponding lower-side-end lower flange plate.

According to the vibration-damped structure having the lower connecting means in this aspect, since the lower end face of the lower-side-end upper flange plate and the upper end face of the corresponding lower-side-end lower flange plate are made to abut against each other, a withstanding force against the large bending moment applied to the box member and the resistance plate can be also obtained at this abutting portion. Furthermore, it is possible to avoid abutment between the lower end face of the box member-side gusset plate and the upper end face of the floor girder-side gusset plate, and it is possible to stably obtain the mutual support of the box member-side gusset plate and the floor girder-side gusset plate by means of the lower splicing-plate means.

The lower connecting means in still another aspect further includes lower-side-end splicing plate means each extending alongside the lower-side-end upper flange plate and the lower-side-end lower flange plate, as well as high-strength bolts for fastening the lower-side-end splicing plate means to both the lower-side-end upper flange plate and the lower-side-end lower flange plate.

According to such a lower connecting means, between horizontal opposite ends of the bottom wall plate of the box member as well, it is possible to secure a further sufficient withstanding force against the tensile force attributable to the large bending moment applied to the box member and the resistance plate, and it is possible to more firmly connect the box member to the lower girder side.

The lower connecting means in a further aspect of the invention includes a rising plate whose lower edge is secured to the floor girder side; lower-side-end flange plates respectively secured to both ends of said rising plate; a lower-side-end inner splicing plate extending vertically alongside one surface of said narrow side wall of said box member and one surface of said lower-side-end flange plate; a lower-side-end outer splicing plate extending vertically alongside another surface of said narrow side wall of said box member and another surface of said lower-side-end flange plate; and high-strength bolts for fastening together said lower-side-end inner splicing plate and said lower-side-end outer splicing plate with said narrow side wall plate and said lower-side-end flange plate interposed therebetween.

According to this lower connecting means, since the narrow side wall of the box member and the lower-side-end flange plate are connected by means of the lower-side-end inner and outer splicing plates which are jointly fastened together with them, the connection is that based on two-plane friction type connection. Hence, it is possible to obtain a firm joint between the narrow side wall of the box member and the lower-side-end flange plate, so that the box member can be firmly joined to the lower girder side. Thus, even if large horizontal force and bending moment are applied to the box member and the resistance plate in the relative horizontal displacement between the box member and the resistance plate at the time of an earthquake or the like, it is possible to sufficiently withstand the shearing force and tensile force based on them. In other words, according to vibration-damped structure having the above-described vibration-damped columns, even if the number of the high-strength bolts is halved to effect the joining of the box member to the lower girder side through the two-plane friction type connection, it is possible to realize firm fixation equivalent to the one-plane friction type connection. Therefore, it is possible to attain a substantial decrease in the working man-hour and a reduction in cost and obtain a compact joining structure. Consequently, on a given floor, it is possible to enlarge the installation space for each of the box member and the resistance plate and use a large box member and a large resistance plate, thereby making it possible to enhance the vibration damping performance further.

In the vibration-damped structure having the vibration-damped columns using the rising plate, at least one of the lower-side-end inner splicing plate and the lower-side-end outer splicing plate may be formed of a high-friction steel plate whose high-friction surface is in contact with the narrow side wall plate and the lower-side-end flange plate, so as to efficiently and desirably secure the withstanding force against the horizontal force and the bending moment. In addition, the lower connecting means may be formed by further including a lower horizontal flange plate superposed on the bottom wall plate of the box member and secured to an upper edge of the rising plate; and high-strength bolts for fastening together the bottom wall plate and the lower horizontal flange plate.

In the case where the lower connecting means is formed by using the lower-side-end inner and outer splicing plates, an auxiliary plate whose one end is secured to the lower-side-end inner splicing plate and which extends alongside an upper surface of the bottom wall plate may be fixed to the bottom wall plate by means of a bolt. By using such an auxiliary plate, in the operation of installing the lower-side-end inner splicing plate, the auxiliary plate can be used like a temporarily fixing jig for the lower-side-end inner splicing plate. Thus, the operation of installing the lower-side-end inner splicing plate can be effected very easily, and the joint with the narrow side wall plate and the wide side wall plate can be effectively restrained by the auxiliary plate such that antiplane deformation will not occur at the joint. Accordingly, it is possible to prevent localized buckling and secure sufficient withstanding force for the joints.

To minimize the amount of projection of the lower-side-end inner splicing plate in the direction of the wall thickness and make it possible to use the wide lower-side-end inner splicing plate, as well as to more effectively obtain the two-plane friction type connection using the lower-side-end inner splicing plate, notches may be respectively formed in the bottom wall plate in a vicinity of one surface of the narrow side wall and in the lower horizontal flange plate in a vicinity of one surface of the lower-side-end flange plate, and the lower-side-end inner splicing plate may be arranged to extend vertically through the notches.

In addition, to ensure that even when execution errors are present, the two-plane friction type connection can be secured by correcting the execution errors at the site and that the firm connection of the box member to the lower girder side can be maintained, filler plates may be interposed in at least one of gaps between the narrow side wall plate and the lower-side-end inner splicing plate, between the lower-side-end flange plate and the lower-side-end inner splicing plate between the narrow side wall plate and the lower-side-end outer splicing plate, and between the lower-side-end flange plate and the lower-side-end outer splicing plate.

In the invention, the above-described lower connecting means may further include a lower-side-end gusset plate secured to the respective other surfaces of the narrow side wall and the lower-side-end flange plate. In such a lower connecting means, the lower-side-end gusset plate may consist of a two-piece member including a lower-side-end upper gusset plate piece secured to the other surface of the narrow side wall as well as a lower-side-end lower gusset plate piece secured to the other surface of the lower-side-end flange plate, the lower-side-end outer splicing plate may consist of a pair of lower-side-end outer splicing plate pieces respectively disposed on both sides of the lower-side-end gusset plate, and the lower connecting means may further include a pair of lower outermost-side-end splicing plates which are disposed in such a manner as to sandwich the lower-side-end upper gusset plate piece and the lower-side-end lower gusset plate piece, as well as high-strength bolts for fastening together the pair of lower outermost-side-end splicing plates with the lower-side-end upper gusset plate piece and the lower-side-end lower gusset plate piece interposed therebetween. Since the stress can be smoothly transmitted by such gusset plates, the connection of the box member to the lower girder side can be made firmer. Moreover, the box member can be connected more firmly to the lower girder side in cooperation with the connection based on the two-plane friction type connection between, on the one hand, the lower-side-end upper gusset plate piece and the lower-side-end lower gusset plate piece and, on the other hand, the pair of lower outermost-side-end splicing plates.

In a preferred example, the lower-side-end upper gusset plate piece and the lower-side-end lower gusset plate piece respectively have notches formed in their mutually opposing upper and lower edge portions to together form a space in a vicinity of a plane of abutment between the bottom wall plate of the box member and the lower horizontal flange plate. By virtue of these notches, slight projection of the bottom wall plate and the lower horizontal flange plate in the laterally outward direction can be allowed, and even if the plane of abutment between the bottom wall plate and the lower horizontal flange plate slightly projects laterally after the mounting of the box member on the lower horizontal flange plate, this projection can be allowed. Furthermore, welding can be provided at the plane of abutment by making use of the space formed by the notches after the mounting. Thus, the bottom wall plate and the lower horizontal flange plate can be firmly secured together by this welding as well in addition to the high-strength bolts.

In the invention, in a case where the resistance plate is used which has a wide resistance plate body and a resistance-plate flange plate secured to an upper end of the resistance plate body, the upper connecting means may include a ceiling girder-side gusset plate secured to the ceiling girder side, a resistance plate-side gusset plate disposed within a vertical plane substantially identical to that of the ceiling girder-side gusset plate and secured to the resistance-plate flange plate, upper splicing plate means disposed in face-to-face relation to the ceiling girder-side gusset plate and the resistance plate-side gusset plate, respectively, and high-strength bolts for fastening the upper splicing-plate means to both the ceiling girder-side gusset plate and the resistance plate-side gusset plate. The resistance plate can be firmly connected and fixed to the ceiling girder side by such an upper connecting means.

In such an upper connecting means, if the upper splicing-plate means is comprised of at least one pair of upper splicing plates for clamping each of the ceiling girder-side gusset plate and the resistance plate-side gusset plate, and the pair of upper splicing plates are arranged to pressingly clamp each of the ceiling girder-side gusset plate and the resistance plate-side gusset plate by tightening forces of the high-strength bolts, the resistance plate-side gusset plate can be connected to the upper girder-side gusset plate by two-plane friction type connection by means of the pair of upper splicing plates. As a result, the resistance plate can be connected and fixed to more firmly to the ceiling girder side, and the it is possible to secure the withstanding force with a less number of high-strength bolts.

In a case where the resistance plate having at least a wide resistance plate body is used, the upper connecting means in the invention includes a ceiling girder-side gusset plate secured to the ceiling girder side, at least one pair of upper splicing plates for clamping each of the ceiling girder-side gusset plate and an upper portion of the resistance plate body from their both sides, and high-strength bolts for fastening together the pair of upper splicing plates with the ceiling girder-side gusset plate and the upper portion of the resistance plate body interposed therebetween. In such an upper connecting means, at least one of the pair of upper splicing plates may be formed of a high-friction steel plate which is disposed with its high-friction surface in contact with the ceiling girder-side gusset plate and the upper portion of the resistance plate body. If such an upper connecting means is used, the ceiling girder-side gusset plate and the upper portion of the resistance plate body can be connected by the two-plane friction type connection including a high friction type joint. Consequently, the resistance plate can be firmly connected and fixed to the ceiling girder side.

In the invention, since the vibration damping means is disposed between the ceiling girder side and the floor girder side by means of the upper connecting means and the lower connecting means, angular moment occurs between the ceiling girder side and the floor girder side due to the deformation of the columns ascribable to vibrations of an earthquake or the like, and there is a possibility that the ceiling girder and the floor girder sway due to this angular moment. If the ceiling girder and the floor girder are thus swayed, it becomes impossible for the vibration damping means to exhibit its vibration damping function as desired. Accordingly, to avoid this, the vibration-damped structure in accordance with the invention preferably further comprises: a pair of reinforcing frame means each arranged such that one end portion thereof is fixed to the ceiling girder side, while another end portion thereof is fixed to a foundation on the ground, the pair of reinforcing frame means being uprightly provided in the vertical direction with the box member interposed therebetween. In a preferred example, each of such reinforcing frame means includes a reinforcing frame fixed to the ceiling girder side and the floor girder side, and each of the reinforcing frame means has a rectangular member.

In the invention, although it is sufficient to provide at least one vibration damping means on one side surface of the column, two vibration damping means may be disposed in such a manner as to oppose each other with the column located therebetween, or three or more vibration damping means may be disposed in such a manner as to surround the column. Further, the vibration damping means may be disposed for only necessary columns selected among all the columns supporting the load of the structure. Furthermore, the vibration damping means may be disposed at column portions on a particular floor of the structure.

Hereafter, a detailed description will be given of the present invention with reference to the preferred embodiments shown in the drawings. It should be noted, however, that the present invention is not limited to these embodiments.

EMBODIMENTS

Figure 1:
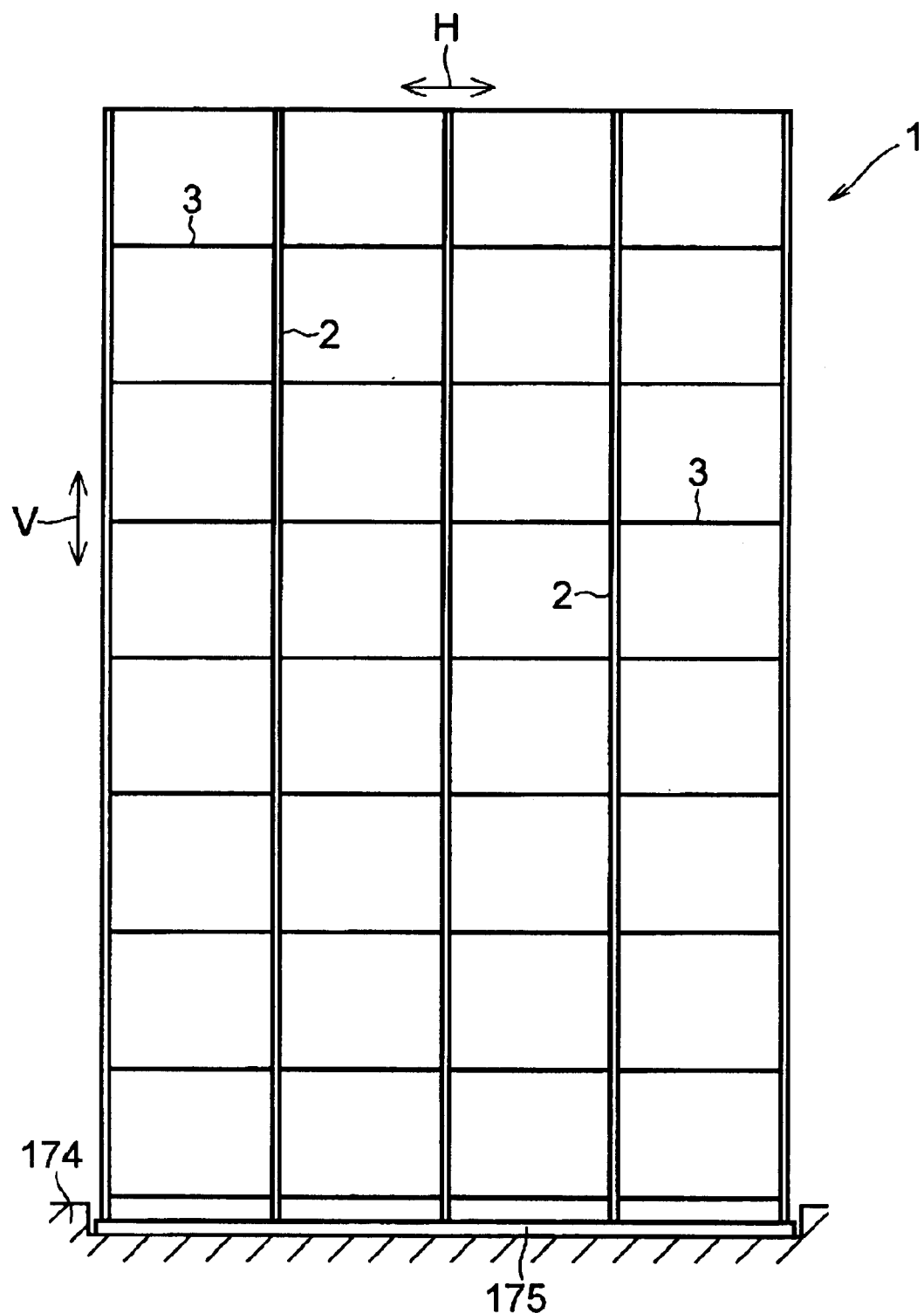
FIG. 1 is an overall diagram of a specific embodiment of a vibration-damped structure in accordance with the invention.
Figure 2:
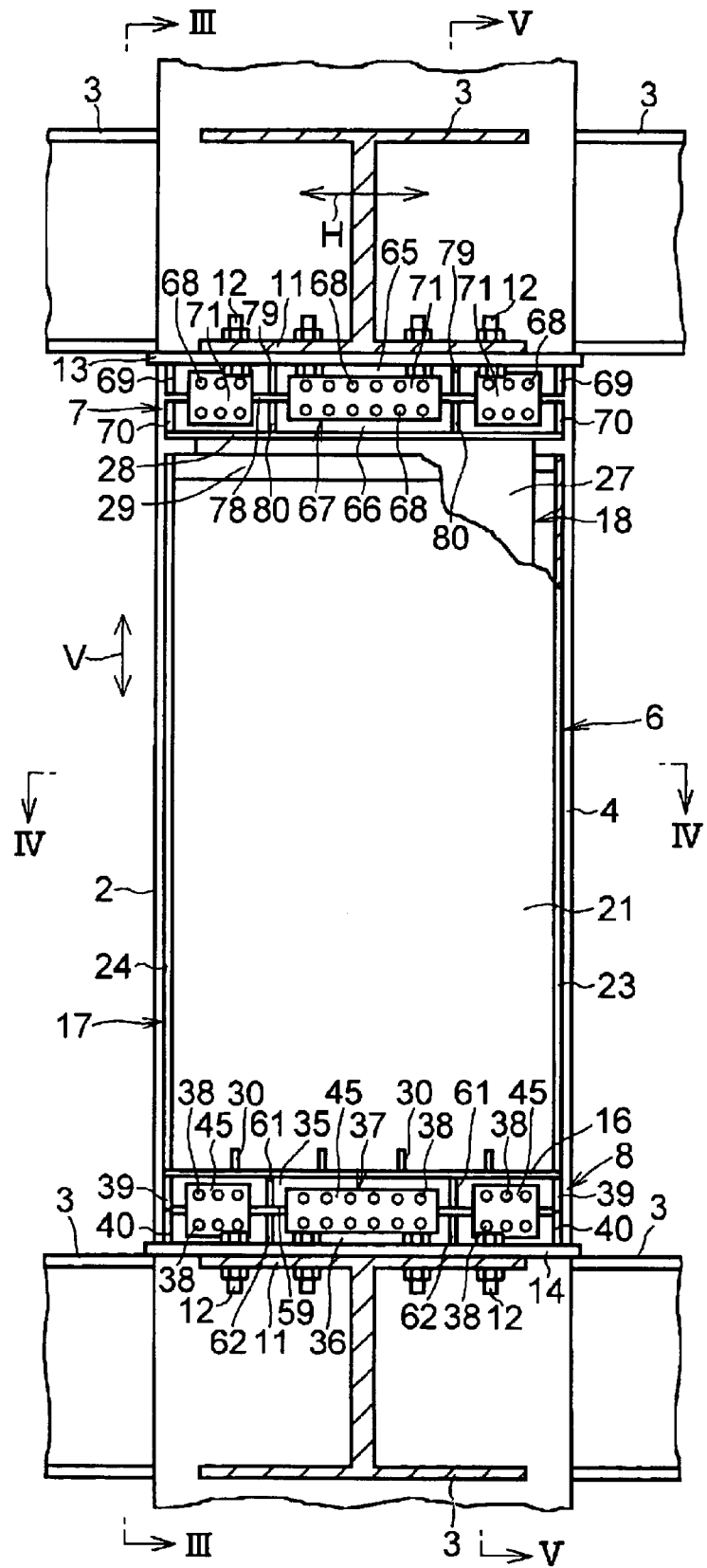
FIG. 2 is a front elevational view of a portion of a column on a predetermined floor of the embodiment shown in FIG. 1 and a vibration damping means applied to this portion.
Figure 3:
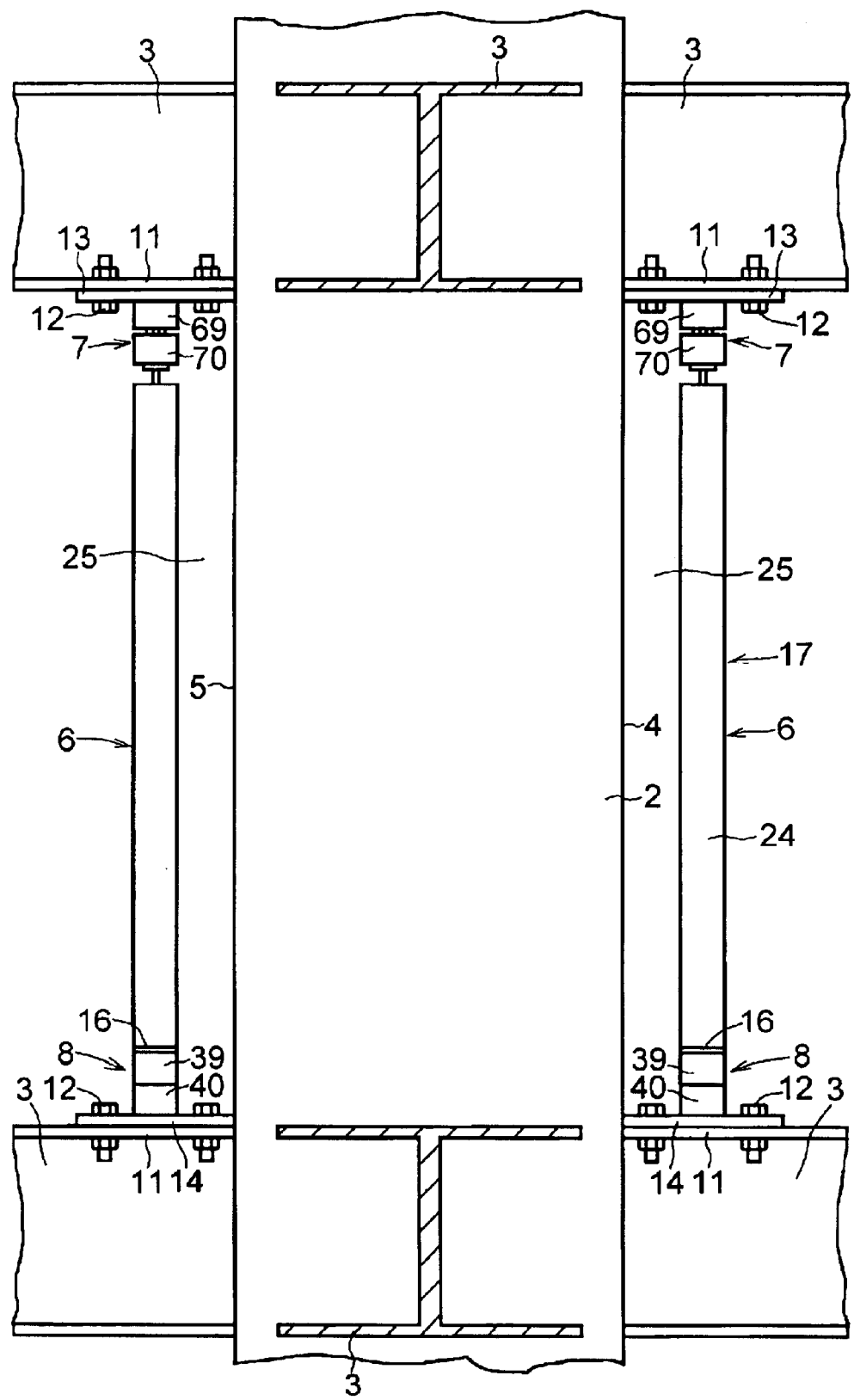
FIG. 3 is a cross-sectional view taken in the direction of arrows along line III—III shown in FIG. 2.
Figure 4:
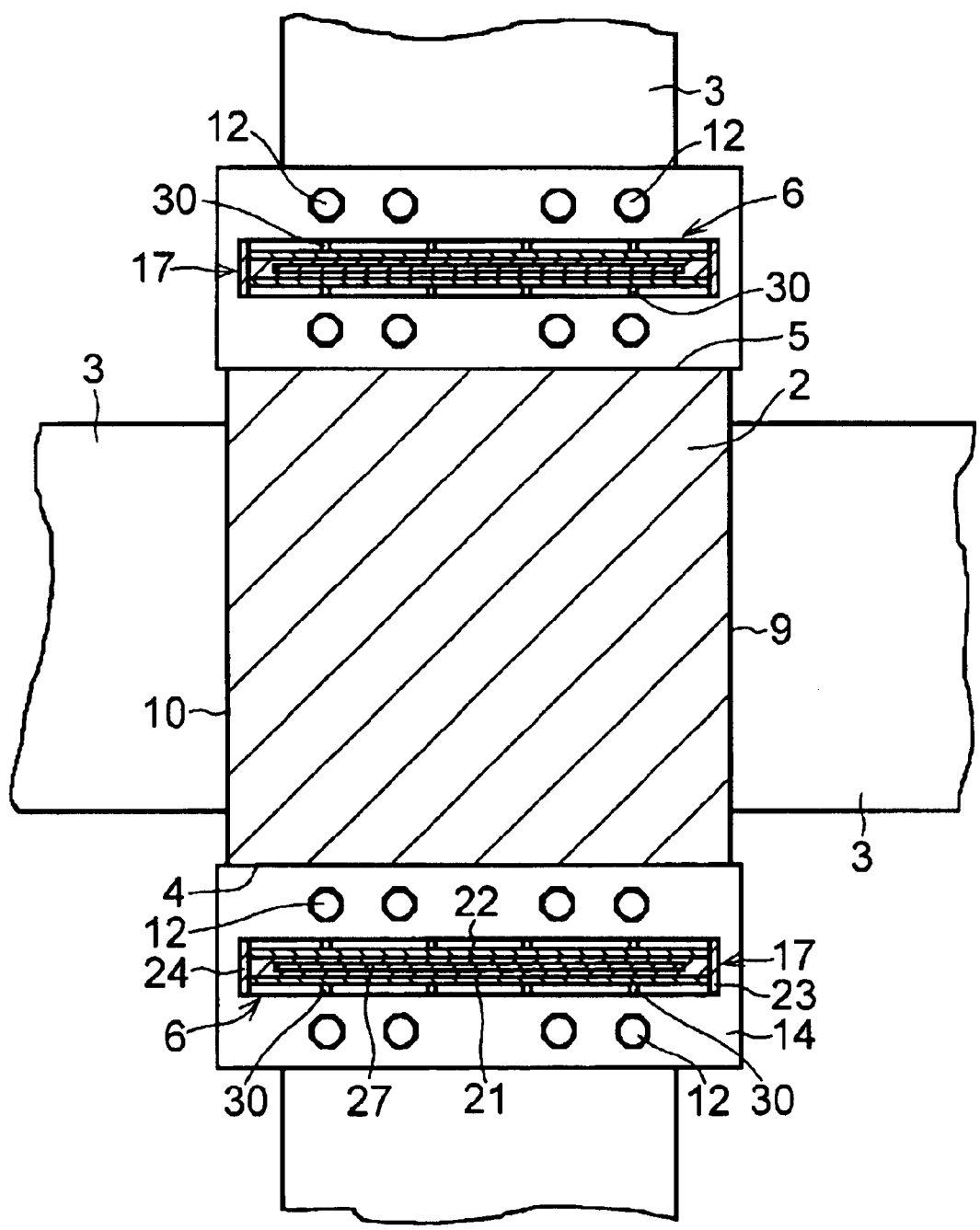
FIG. 4 is a cross-sectional view taken in the direction of arrows along line IV—IV shown in FIG. 2.
Figure 5:
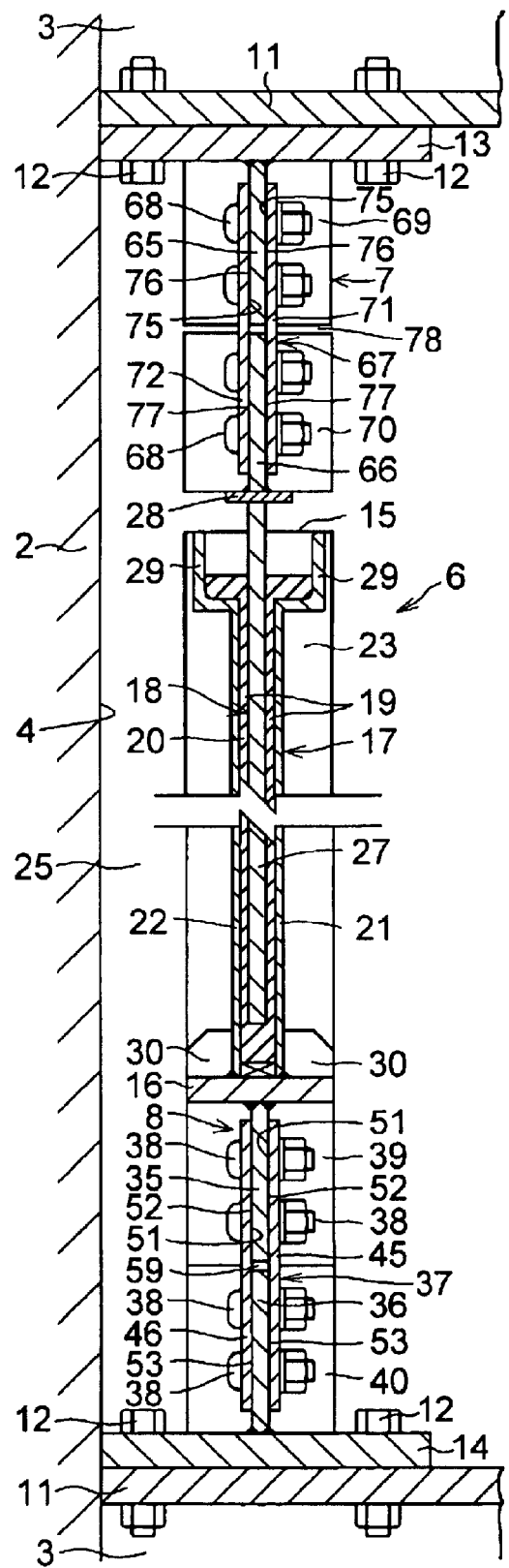
FIG. 5 is a cross-sectional view taken in the direction of arrows along line V—V shown in FIG. 2.
Figure 6:
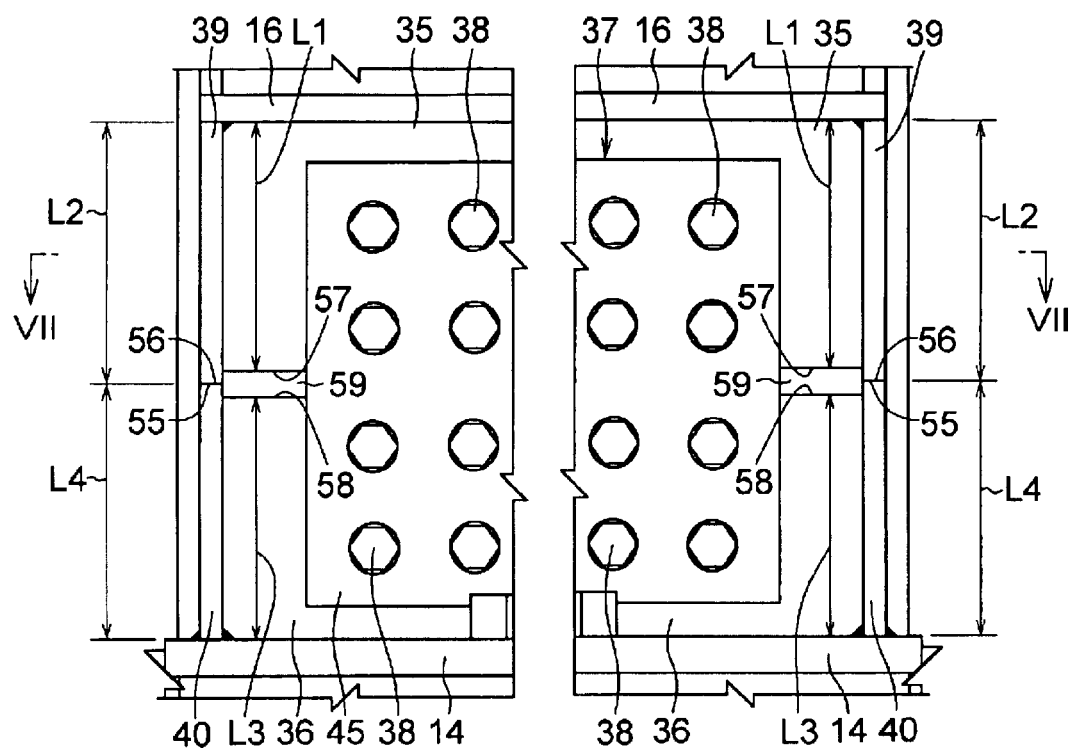
FIG. 6 is a partially enlarged view of the embodiment shown in FIG. 1.
Figure 7:
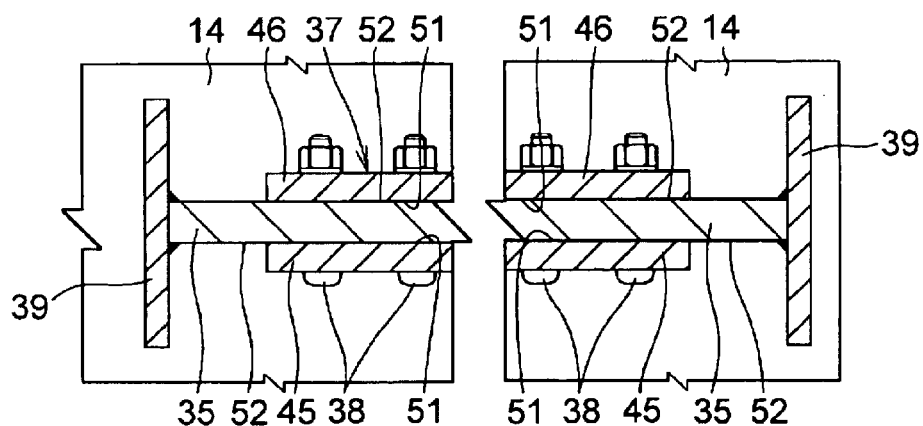
FIG. 7 is a cross-sectional view taken in the direction of arrows along line VII—VII shown in FIG. 6.

In FIGS. 1 to 7, a high-rise building 1 serving as a vibration-damped structure in accordance with this embodiment is comprised of a plurality of quadrangular columns (square columns) 2 disposed in such a manner as to extend in a vertical direction V so as to support the vertical load of the building 1; a plurality of girders 3 disposed in such a manner as to extend horizontally between the respective square columns 2 so as to bridge the respective square columns 2; two vibration damping means 6 juxtaposed to opposing side surfaces 4 and 5 of each square column 2 on a predetermined floor, e.g., each floor, of the building 1; and upper and lower connecting means 7 and 8 for connecting the respective vibration damping means 6 to the respective ceiling- and floor-side girders 3 on each floor.

Each square column 2 is made of reinforced or steel framed concrete and supports respective one end portions of the girders 3.

At one end portion of each girder 3 formed of H shape steel, mounting plates 13 and 14 are securely attached by means of bolts 12 to a flange portion 11 on which the vibration damping means 6 is disposed.

Since the vibration damping means 6 disposed for the side surface 4 and the vibration damping means 6 disposed for the side surface 5 are constructed in the same manner, a description will be given below of the vibration damping means 6 disposed for the side surface 4. It should be noted that the vibration damping means 6 may be also disposed for the other opposing side surfaces 9 and 10 of the square column 2.

The vibration damping means 6 includes a box member 17 having an opening 15 at its upper portion and a bottom wall plate 16 at its lower portion and connected at the bottom wall plate 16 to the floor girder 3 side by means of the lower connecting means 8; a resistance plate 13 extending in and outside the box member 17 through the opening 15 of the box member 17 and connected at its portion located outside the box member 17 to the ceiling girder 3 side by means of the upper connecting means 7; and a viscous material 20 filled in a gap 19 formed between the box member 17 and a portion of the resistance plate 18 located within the box member 17.

In addition to the bottom wall plate 16, the box member 17 has a pair of wide side wall plates 21 and 22 secured to the bottom wall plate 16 by welding or the like as well as a pair of narrow side wall plates 23 and 24 disposed in face-to-face relation to each other in the lateral direction and secured to the bottom wall plate 16 and the wide side wall plates 21 and 22 by welding or the like. One wide side wall plate 22 is disposed such that its wide surface opposes the side surface 4 of the square column 2 with a clearance 25.

The resistance plate 18 has a wide resistance plate body 27 disposed in such a manner as to be parallel to the wide side wall plates 21 and 22, as well as a resistance-plate flange plate 28 secured to an upper end of the resistance plate body 27 by welding or the like.

The viscous material 20 is filled in the gap 19 between the box member 17 and the resistance plate body 27 disposed in the box member 17.

A pair of opening forming members 29 each having an L-shaped cross section are respectively secured to upper edges of the respective wide side wall plates 21 and 22 by welding or the like to obtain a wide opening 15. A plurality of ribs 30 are secured to the wide side wall plates 21 and 22 and the bottom wall plate 16 by welding or the like to make the fixation between the wide side wall plates 21 and 22 and the bottom wall plate 16 more reliable.

The lower connecting means 8 includes a box member-side gusset plate 35 secured to the bottom wall plate 16 of the box member 17 by welding or the like: a floor girder-side gusset plate 36 disposed within a vertical plane substantially Identical to that of the box member-side gusset plate 35 and secured to the mounting plate 14 on the floor girder 3 side by welding or the like; a lower splicing plate means 37 disposed in face-to-face relation to the box member-side gusset plate 35 and the floor girder-side gusset plate 36, respectively; high-strength bolts 38 for fastening the lower splicing-plate means 37 to both the box member-side gusset plate 35 and the floor girder-side gusset plate 36; a pair of lower-side-end upper flange plates 39 respectively secured to horizontal opposite ends of the bottom wall plate 16 of the box member 17 and the box member-side gusset plate 35 and having a vertical length L2 longer than the vertical length L1 of the box member-side gusset plate 35; and a pair of lower-side-end lower flange plates 40 respectively secured to horizontal opposite ends of the floor girder-side gusset plate 36 and having a vertical length L4 longer than the vertical length L3 of the floor girder-side gusset plate 36.

The lower splicing-plate means 37 has lower splicing plates 45 and 46 consisting of at least one pair, or three horizontally arranged pairs in this embodiment, of high-friction steel plates for clamping each of the box member-side gusset plate 35 and the floor girder-side gusset plate 36. The respective lower splicing plates 45 and 46 pressingly clamp each of the box member-side gusset plate 35 and the floor girder-side gusset plate 36 by the tightening forces of the high-strength bolts 38.

At least one of the lower splicing plates 45 and 46 in each pair, or both of the lower splicing plates 45 and 46 in each pair in this embodiment, are disposed such that their high-friction surfaces 51 are in contact with wide surfaces 52 and 53 of the box member-side gusset plate 35 and the floor girder-side gusset plate 36.

A lower end face 55 of each lower-side-end upper flange plate 39 abuts against an upper end face 56 of the corresponding lower-side-end lower flange plate 40, with the result that a gap 59 is formed between a lower end face 57 of the box member-side gusset plate 35 and an upper end face 58 of the floor girder-side gusset plate 36.

A plurality of ribs 61 and 62 are respectively secured to the bottom wall plate 16 and the box member-side gusset plate 35 and to the mounting plate 14 and the floor girder-side gusset plate 36 by welding or the like to make the fixation between the bottom wall plate 16 and the box member-side gusset plate 35 and the fixation between the mounting plate 14 and the floor girder-side gusset plate 36 more reliable.

The upper connecting means 7 includes a ceiling girder-side gusset plate 65 secured to the mounting plate 13 on the ceiling girder 3 side by welding or the like; a resistance plate-side gusset plate 66 disposed within a vertical plane substantially identical to that of the ceiling girder-side gusset plate 65 and secured to the resistance-plate flange plate 28 by welding or the like; an upper splicing plate means 67 disposed in face-to-face relation to the ceiling girder-side gusset plate 65 and the resistance plate-side gusset plate 66, respectively; high-strength bolts 68 for fastening the upper splicing-plate means 67 to both the ceiling girder-side gusset plate 65 and the resistance plate-side gusset plate 66; a pair of upper-side-end flange plates 69 respectively secured to a lower surface of the ceiling girder-side mounting plate 13 and opposite side ends of the ceiling girder-side gusset plate 65 by welding or the like; and a pair of upper-side-end flange plates 70 respectively secured to an upper surface of the resistance-plate flange plate 28 and opposite side ends of the resistance plate-side gusset plate 66 by welding or the like.

The upper splicing-plate means 67 is constructed in the same way as the lower splicing-plate means 37, and has upper splicing plates 71 and 72 consisting of at least one pair, or three pairs in this embodiment, of high-friction steel plates for clamping each of the ceiling girder-side gusset plate 65 and the resistance plate-side gusset plate 66. Each pair of upper splicing plates 71 and 72 pressingly clamp each of the ceiling girder-side gusset plate 65 and the resistance plate-side gusset plate 66 by the tightening forces of the high-strength bolts 68.

Each pair of upper splicing plates 71 and 72 are also disposed such that their high-friction surfaces 75 are in contact with respective wide surfaces 76 and 77 of the ceiling girder-side gusset plate 65 and the resistance plate-side gusset plate 66.

The ceiling girder-side gusset plate 65 and the resistance plate-side gusset plate 66, and the upper-side-end flange plates 69 and 70 are so arranged that gaps 78 are respectively formed between their lower end faces and upper end faces.

A plurality of ribs 79 and 80 are respectively secured to the mounting plate 13 and the ceiling girder-side gusset plate 65 and to the resistance-plate flange plate 28 and the resistance plate-side gusset plate 66 by welding or the like to make more reliable the fixation between the mounting plate 13 and the ceiling girder-side gusset plate 65 and the fixation between the resistance-plate flange plate 28 and the resistance plate-side gusset plate 66.

According to the above-described building 1, when the ceiling-side girders 3 are displaced in a horizontal direction (lateral direction) H with respect to the floor-side girders 3 due to an earthquake, winds, traffic vibrations, or the like, and the square columns 2 undergo flexural deformation in the lateral direction H, relative displacement occurs between each box member 17 and each resistance plate 18. Consequently, the viscous material 20 is sheared by the resistance plate body 27 due to this relative displacement, so that it is possible to absorb the relative displacement energy in the horizontal direction H of the ceiling-side girder 3 with respect to the floor-side girder 3 by the shearing of the viscous material 20, thereby making it possible to damp as quickly as possible the vibrations in the horizontal direction H of the building 1 due to the earthquake, winds, traffic vibrations, and the like. Thus, the vibration of the building 1 can be damped by the vibration damping means 6 juxtaposed to the side surfaces 4 and 5 of each square column 2, and the vibration damping means 6 can be installed without needing to partition the interior of the building 1 into small units for the vibration damping means 6 and without being limited by the passage space.

Figure 8:
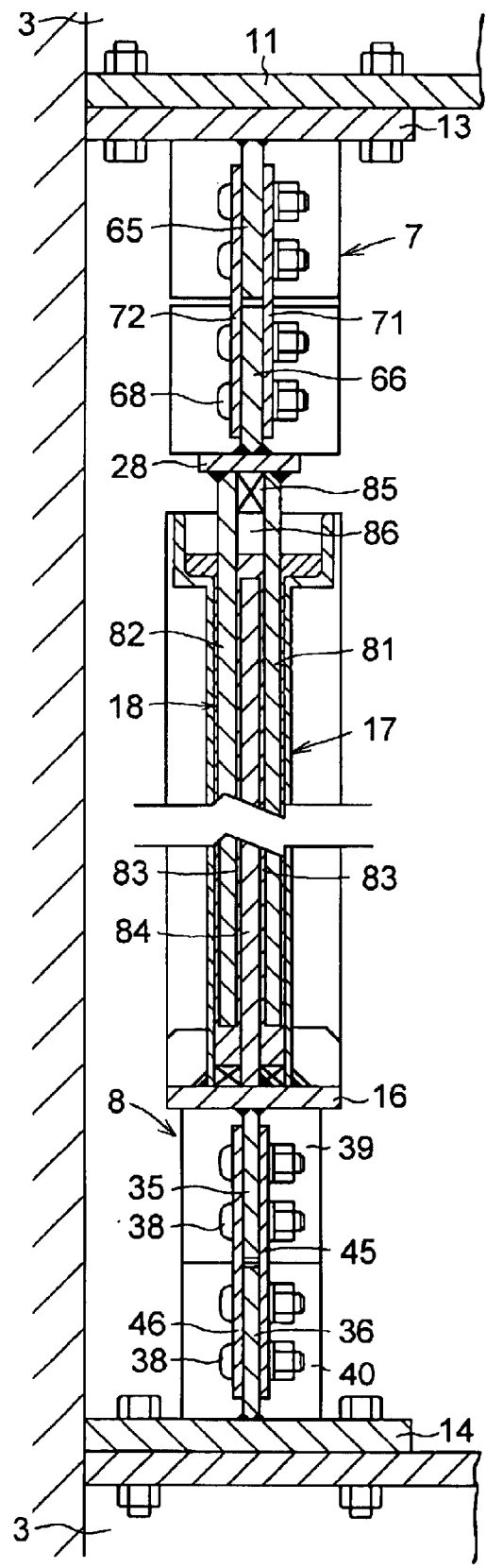
FIG. 8 is an explanatory cross-sectional view of a modification of the embodiment shown in FIG. 1.

Although, with the above-described building 1, the resistance plate 18 is formed by providing the single wide resistance plate body 27, the resistance plate 18 may be formed by providing a plurality of, e.g., two, wide resistance plate bodies 81 and 82 opposing each other with a gap 86 therebetween by a gap holding plate 85, as shown in FIG. 8. In this case, it suffices if each vibration damping means 6 is constructed as follows: The box member 17 is formed by being further provided with an intermediate plate 84 disposed in the gap between the resistance plate bodies 81 and 82 with a gap 83 with each of the resistance plate bodies 81 and 82 and secured to the bottom wall plate 16. The resistance plate 18 is formed by welding and securing the resistance plate bodies 81 and 82 at their upper ends to the resistance-plate flange plate 28, and the viscous material 20 is filled also in the gap 83 between the intermediate plate 84 and each of the resistance plate bodies 81 and 82.

With the building 1 using the vibration damping means 6 shown in FIG. 8, it is possible to equally obtain the above-described effects and enhance the vibration damping performance further.

Figure 9:
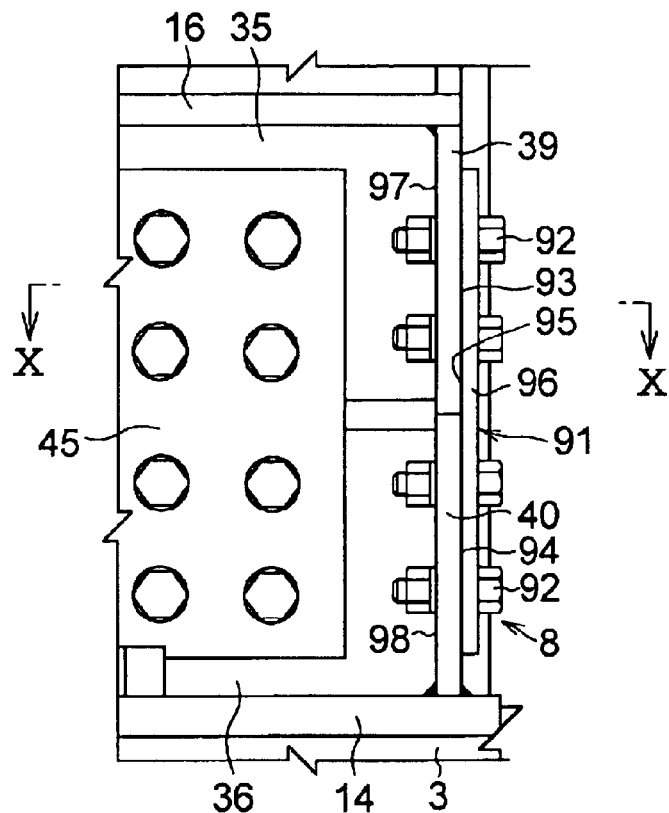
FIG. 9 is an explanatory diagram of another example of a lower connecting means in the embodiment shown in FIG. 1.
Figure 10:
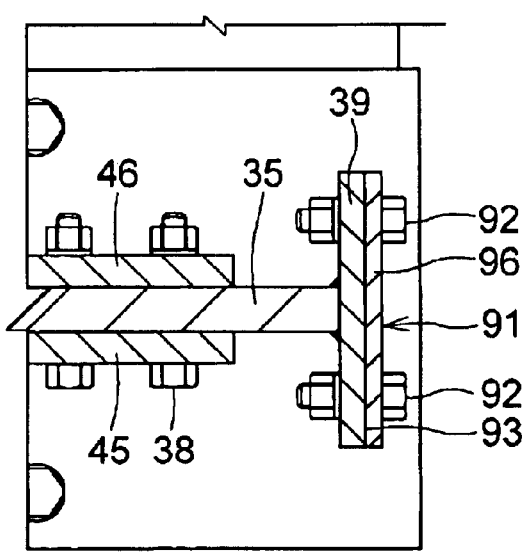
FIG. 10 is a cross-sectional view taken in the direction of arrows along line X—X shown in FIG. 9.

In addition, as shown in FIGS. 9 and 10, the lower connecting means 8 may be embodied by being further provided with a pair of lower-side-end splicing plate means 91 each extending alongside the lower-side-end upper flange plate 39 and the lower-side-end lower flange plate 40, as well as high-strength bolts 92 for fastening the lower-side-end splicing plate means 91 to both the lower-side-end upper flange plate 39 and the lower-side-end lower flange plate 40.

The lower-side-end splicing plate means 91 shown in FIGS. 9 and 10 has a lower-side-end splicing plate 96 consisting of a single high-friction steel plate whose high-friction surface 95 is frictionally connected to respective outer surfaces 93 and 94 of the lower-side-end upper flange plate 39 and the lower-side-end lower flange plate 40.

According to the lower connecting means 8 shown in FIGS. 9 and 10, it is possible to secure a more sufficient withstanding force with respect to the tensile force attributable to large bending moment applied to the box member 17 and the resistance plate 18 between the horizontal opposite ends of the bottom wall plate 16 of the box member 17, thereby making it possible to connect the box member 17 to the lower girder 3 side more firmly.

Two lower-side-end splicing plates similar to the lower-side-end splicing plate 96 may be disposed also on and frictionally connected to respective inner surfaces 97 and 98 of the lower-side-end upper flange plate 39 and the lower-side-end lower flange plate 40 by the high-strength bolts 92.

Figure 11:
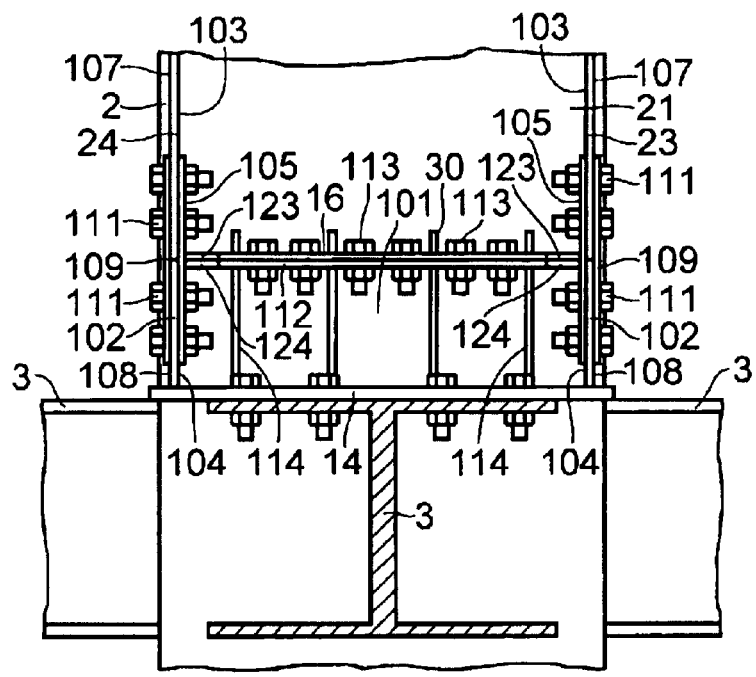
FIG. 11 is an explanatory diagram of still another example of the lower connecting means in the embodiment shown in FIG. 1.
Figure 12:
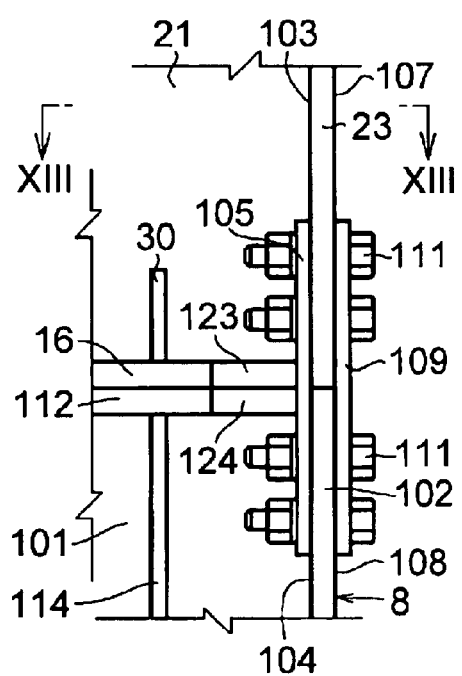
FIG. 12 is a partially enlarged view of the example shown in FIG. 11.
Figure 13:
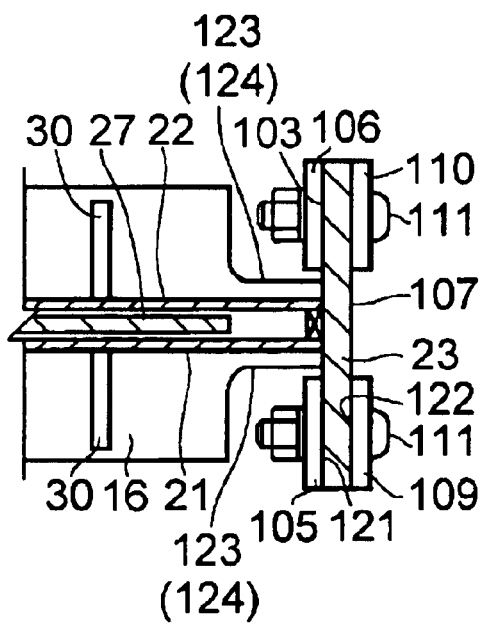
FIG. 13 is a cross-sectional view taken in the direction of arrows along line XIII—XIII shown in FIG. 12.

Further, as shown in FIGS. 11 to 13, the lower connecting means 8 may further include a rising plate 101 whose lower edge is secured to the mounting plate 14 on the floor girder 3 side; a pair of lower-side-end flange plates 102 respectively secured to both ends of the rising plate 101; two pairs of lower-side-end inner splicing plates 105 and 106 each extending vertically alongside one surface 103 of each of the narrow side wall plates 23 and 24 of the box member 17 and one surface 104 of each of the lower-side-end flange plates 102; two pairs of lower-side-end outer splicing plate pieces 109 and 110 serving as lower-side-end outer splicing plates and each extending vertically alongside the other surface 107 of each of the narrow side wall plates 23 and 24 of the box member 17 and the other surface 108 of each of the lower-side-end flange plates 102; high-strength bolts 111 for fastening together each of the lower-side-end inner splicing plates 105 and 106 and of the lower-side-end outer splicing plate pieces 109 and 110 with each of the narrow side wall plates 23 and 24 and each of the lower-side-end flange plates 102 interposed therebetween; a lower horizontal flange plate 112 superposed on the bottom wall plate 16 of the box member 17 and secured to an upper edge of the rising plate 101; high-strength bolts 113 for fastening together the bottom wall plate 16 and the lower horizontal flange plate 112; and reinforcing ribs 114 secured to the rising plate 101, the lower horizontal flange plate 112, and the mounting plate 14, respectively, by welding or the like.

In the lower connecting means 8 shown in FIGS. 11 to 13, at least one pair, or both pairs in this embodiment, of the pair of the lower-side-end inner splicing plates 105 and 106 and the pair of the lower-side-end outer splicing plate pieces 109 and 110 are formed of high-friction steel plates whose high-friction surfaces 121 and 122 are in contact with the surfaces 103 and 107 as well as 104 and 108 of each of the narrow side wall plates 23 and 24 and each of the lower-side-end flange plates 102. Notches 123 and 124 are respectively formed in the bottom wall plate 16 in the vicinity of one surface 103 of each of the narrow side wall plates 23 and 24 and in the lower horizontal flange plate 112 in the vicinity of one surface 104 of each of the lower-side-end flange plates 102. The lower-side-end inner splicing plates 105 and 106 respectively extend vertically through the notches 123 and 124.

According to the lower connecting means 8 shown in FIGS. 11 to 13, since each of the narrow side wall plates 23 and 24 of the box member 17 and each of the pair of lower-side-end flange plates 102 are connected to each other by means of the lower-side-end inner splicing plates 105 and 106 and the lower-side-end outer splicing plate pieces 109 and 110 which are fastened together with these members by the high-strength bolts 111, the connection is that based on two-plane friction type connection. Hence, it is possible to obtain a firm joint between each of the narrow side wall plates 23 and 24 of the box member 17 and each of the lower-side-end flange plates 102, so that the box member 17 can be firmly joined to the mounting plate 14 on the lower girder 3 side. Thus, even if large horizontal force and bending moment are applied to the box member 17 and the resistance plate 18 in the relative horizontal displacement between the box member 17 and the resistance plate 18 at the time of an earthquake or the like, it is possible to sufficiently withstand the shearing force and tensile force based on them. In other words, according to the above-described lower connecting means 8, even if the number of the high-strength bolts 111 is halved to effect the joining of the box member 17 to the lower girder 3 side through the two-plane friction type connection, it is possible to realize firm fixation equivalent to the one-plane friction type connection. Therefore, it is possible to attain a substantial decrease in the working man-hour and a reduction in cost, obtain a compact joining structure, and enhance the vibration damping performance further.

In addition, according to the lower connecting means 8, since the lower-side-end inner splicing plates 105 and 106 are arranged to respectively extend vertically through the notches 123 and 124, the amount of projection of the lower-side-end inner splicing plates 105 and 106 in antiplane directions can be minimized, and wide lower-side-end inner splicing plates 105 and 106 can be used.

Figure 14:
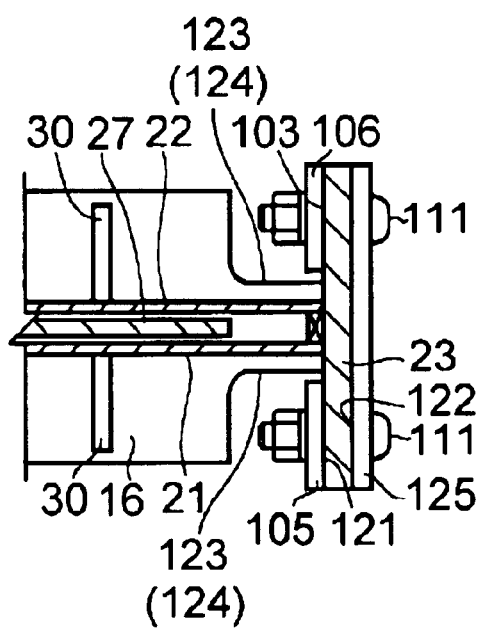
FIG. 14 is an explanatory diagram of a further example of the lower connecting means in the embodiment shown in FIG. 11.

Although, in the lower connecting means 8 shown in FIGS. 11 to 13, two pairs of divided lower-side-end outer splicing plate pieces 109 and 110 are used as the lower-side-end outer splicing plates, the lower connecting means 8 may be embodied by alternatively using a pair of integrated lower-side-end outer splicing plates 125, as shown in FIG. 14.

Figure 15:
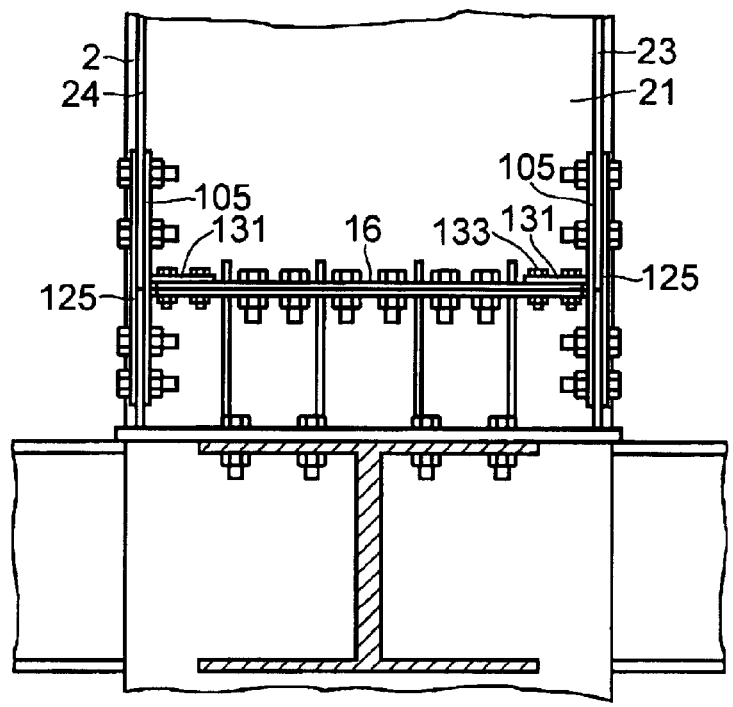
FIG. 15 is an explanatory diagram of a further example of the lower connecting means in the embodiment shown in FIG. 1.
Figure 16:
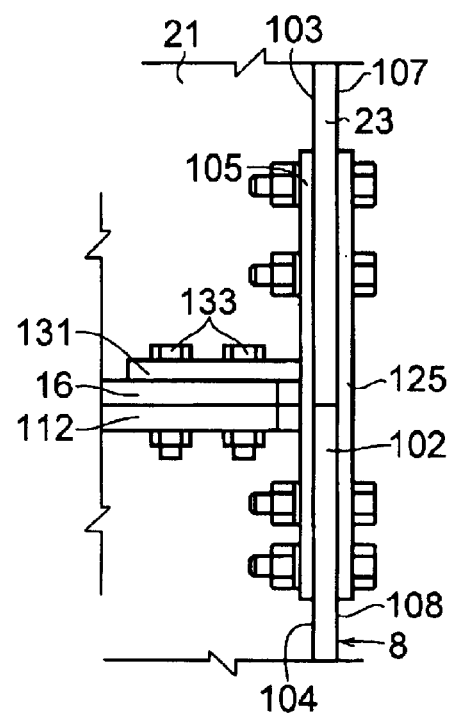
FIG. 16 is a partially enlarged view of the example shown in FIG. 15.
Figure 17:
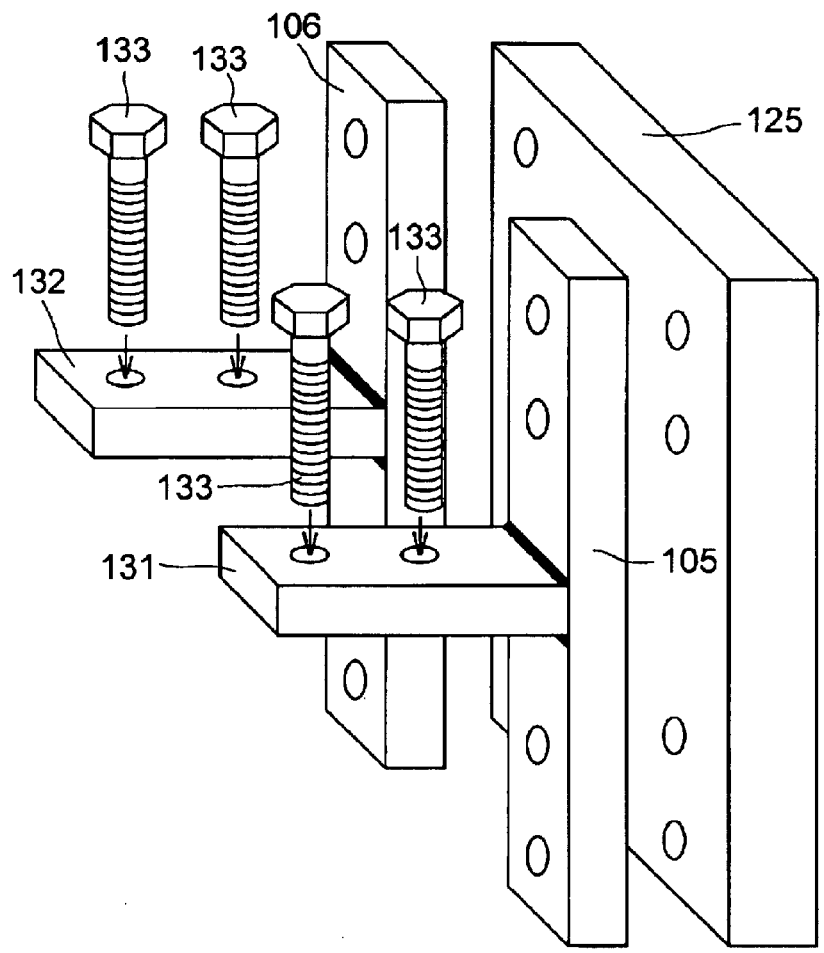
FIG. 17 is a partially exploded perspective view of the example shown in FIG. 15.

Further, as shown in FIGS. 15 to 17, the lower connecting means 8 may be embodied by providing two pairs of auxiliary plates 131 and 132 whose one ends are respectively secured to the lower-side-end inner splicing plates 105 and 106 and which extend alongside an upper surface of the bottom wall plate 16, as well as bolts 133 for fixing the auxiliary plates 131 and 132 to the bottom wall plate 16.

By using such auxiliary plates 131 and 132, in the operation of installing the lower-side-end inner splicing plates 105 and 106, the auxiliary plates 131 and 132 can be used like temporarily fixing jigs for the lower-side-end inner splicing plates 105 and 106. Thus, the operation of installing the lower-side-end inner splicing plates 105 and 106 can be effected very easily, and the joints with the narrow side wall plates 23 and 24 and the wide side wall plates 21 and 22 can be effectively restrained by the auxiliary plates 131 and 132 such that antiplane deformation will not occur at these joints. Accordingly, it is possible to prevent localized buckling and secure sufficient withstanding force for the joints.

Filler plates (not shown) may be interposed in at least one of the gaps between each of the narrow side wall plates 23 and 24 and each of the lower-side-end inner splicing plates 105 and 106, between each of the lower-side-end flange plates 102 and each of the lower-side-end inner splicing plates 105 and 106, between each of the narrow side wall plates 23 and 24 and each of the lower-side-end outer splicing plate pieces 109 and 110 or the lower-side-end outer splicing plate 125, and between each of the lower-side-end flange plates 102 and each of the lower-side-end outer splicing plate pieces 109 and 110 or the lower-side-end outer splicing plate 125, so as to effect correction of attachment errors of these plates, differences (execution errors) in their plate thickness, and the like by the use of these filler plates.

Figure 18:
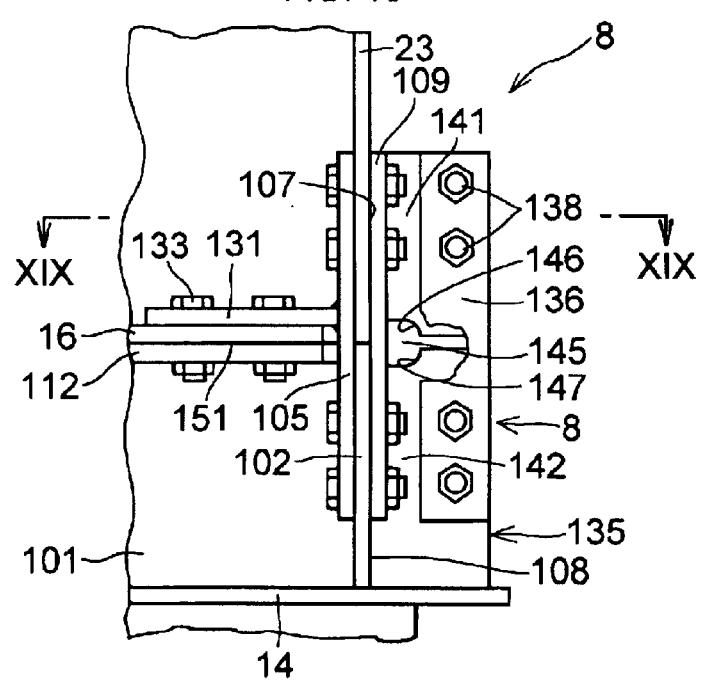
FIG. 18 is an explanatory diagram of a still further example of the lower connecting means in the embodiment shown in FIG. 1.
Figure 19:
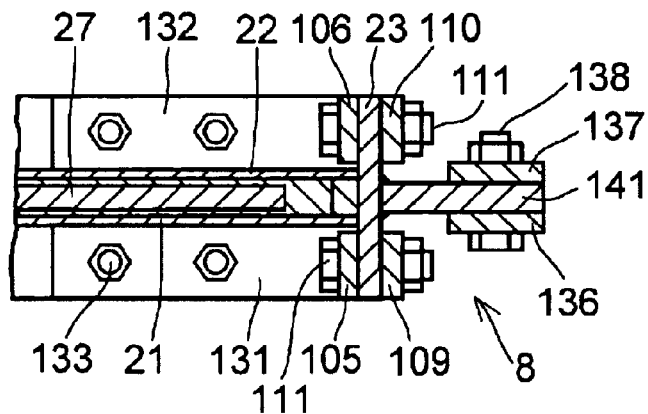
FIG. 19 is a cross-sectional view taken in the direction of arrows along line XIX—XIX shown in FIG. 18.
Figure 20:
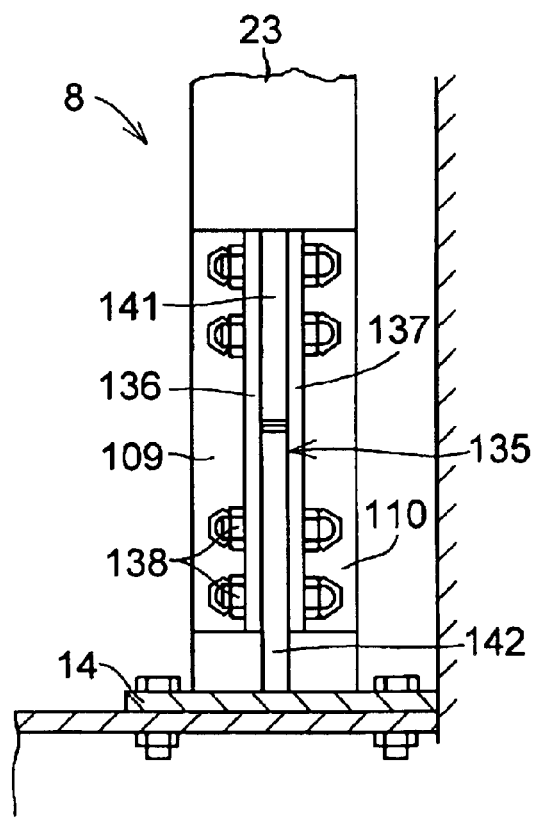
FIG. 20 is a side elevational view of the example shown in FIG. 18.

Furthermore, as shown in FIGS. 18 to 20, the lower connecting means 8 may be constructed such that a lower-side-end gusset plate 135 is secured to the respective other surfaces 107 and 108 of each of the narrow side wall plates 23, 24 and each of the lower-side-end flange plates 102 by welding or the like, a pair of lower outermost-side-end splicing plates 136 and 137 are disposed in such a manner as to sandwich the lower-side-end gusset plate 135, and the pair of lower outermost-side-end splicing plates 136 and 137 are jointly fastened with the lower-side-end gusset plate 135 interposed therebetween by high-strength bolts 138.

In the lower connecting means 8 shown in FIGS. 18 to 20, the lower-side-end gusset plate 135 consists of a two-piece member including a lower-side-end upper gusset plate piece 141 secured to the other surface 107 of each of the narrow side wall plates 23 and 24 as well as a lower-side-end lower gusset plate piece 142 secured to the other surface 108 of each of the lower-side-end flange plates 102. The lower-side-end outer splicing plate pieces 109 and 110 are disposed on both sides of the lower-side-end gusset plate 135, the pair of lower outermost-side-end splicing plates 136 and 137 are disposed in such a manner as to sandwich the lower-side-end upper gusset plate piece 141 and the lower-side-end lower gusset plate piece 142, and the high-strength bolts 138 fasten together the pair of lower outermost-side-end splicing plates 136 and 137 with the lower-side-end upper gusset plate piece 141 and the lower-side-end lower gusset plate piece 142 interposed therebetween. The lower-side-end upper gusset plate piece 141 and the lower-side-end lower gusset plate piece 142 respectively have notches 146 and 147 formed in their mutually opposing upper and lower edge portions to together form a space 145 in the vicinity of a plane of abutment 151 between the bottom wall plate 16 of the box member 17 and the lower horizontal flange plate 112.

According to the lower connecting means 8 shown in FIGS. 18 to 20, since the stress can be smoothly transmitted by the lower-side-end gusset plate 135, the connection of the box member 17 to the lower girder 3 side can be made firmer. Moreover, the box member 17 can be connected more firmly to the lower girder 3 side in cooperation with the connection based on the two-plane friction type connection at the narrow side wall plates 23 and 24 and the lower-side-end flange plates 102. In addition, by virtue of the notches 146 and 147, slight projection of the bottom wall plate 16 and the lower horizontal flange plate 112 in the laterally outward direction can be allowed, and even if the plane of abutment 151 between the bottom wall plate 16 and the lower horizontal flange plate 112 slightly projects laterally after the mounting of the box member 17 on the lower horizontal flange plate 112, this projection can be allowed. Furthermore, welding can be provided at the plane of abutment 151 by making use of the space 145 formed by the notches 146 and 147 after the mounting. Thus, the bottom wall plate 16 and the lower horizontal flange plate 112 can be firmly secured together by this welding as well in addition to the high-strength bolts 113.

Figure 21:
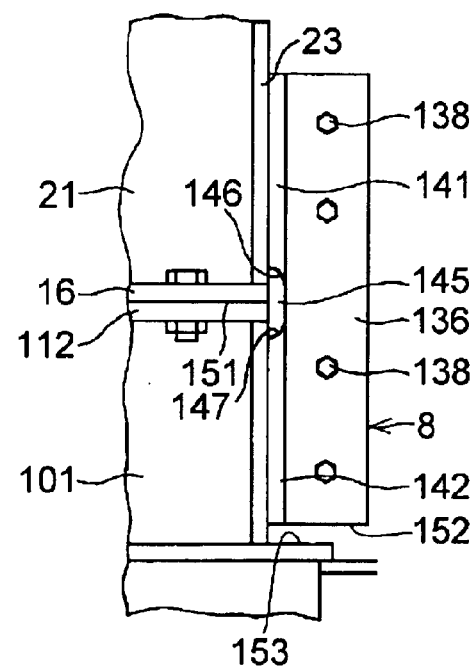
FIG. 21 is an explanatory diagram of a further example of the lower connecting means in the embodiment shown in FIG. 18.
Figure 22:
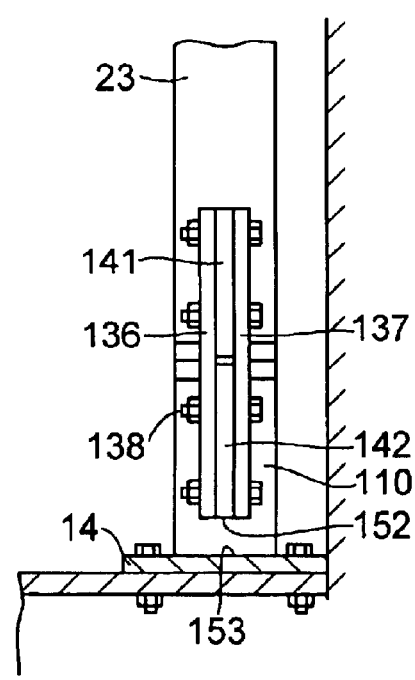
FIG. 22 is a side elevational view of the example shown in FIG. 21.

In the case of the lower connecting means 8 having the lower-side-end gusset plate 135 and the lower outermost-side-end splicing plates 136 and 137 for effecting two-plane friction type connection, as shown in FIGS. 21 and 22, execution may be carried out by omitting the lower-side-end inner splicing plates 105 and 106, the lower-side-end outer splicing plate pieces 109 and 110, and the high-strength bolts 111. In addition, a lower edge 152 of the lower-side-end lower gusset plate piece 142 may be made to float from the upper surface 153 of the mounting plate 14 without being welded to an upper surface 153 of the mounting plate 14.

Figure 23:
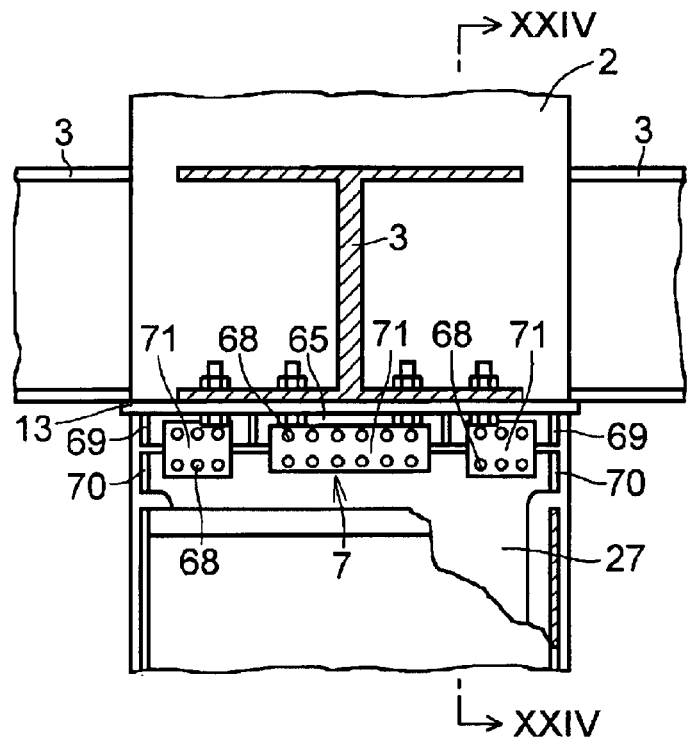
FIG. 23 is an explanatory diagram of another example of an upper connecting means in the embodiment shown in FIG. 1.
Figure 24:
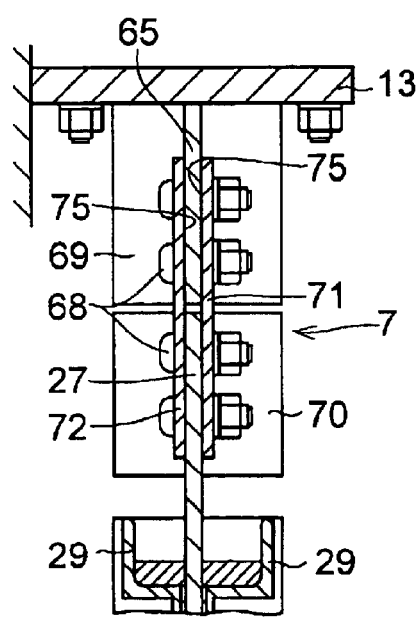
FIG. 24 is a cross-sectional view taken in the direction of arrows along line XXIV—XXIV shown in FIG. 23.

Although in the above-described example the resistance-plate flange plate 28 is provided in the resistance plate body 27, the resistance plate 18 may be embodied by omitting such a resistance-plate flange plate 28, as shown in FIGS. 23 and 24.

In the case where the resistance plate 18 shown in FIGS. 23 and 24 is used, the upper connecting means 7 may include the ceiling girder-side gusset plate 65 secured to the mounting plate 13 on the ceiling girder 3 side by welding or the like; at least one pair, or three pairs in this embodiment, of upper splicing plates 71 and 72 for clamping each of the ceiling girder-side gusset plate 65 and an upper portion of the resistance plate body 27 from their both sides; and the high-strength bolts 68 for fastening together the upper splicing plates 71 and 72 with the ceiling girder-side gusset plate 65 and the upper portion of the resistance plate body 27 interposed therebetween. In such an upper connecting means 7 as well, the pairs of upper splicing plates 71 and 72 are preferably formed of high-friction steel plates which are disposed with their high-friction surfaces 75 abutting against the ceiling girder-side gusset plate 65 and the upper portion of the resistance plate body 27.

Figure 25:
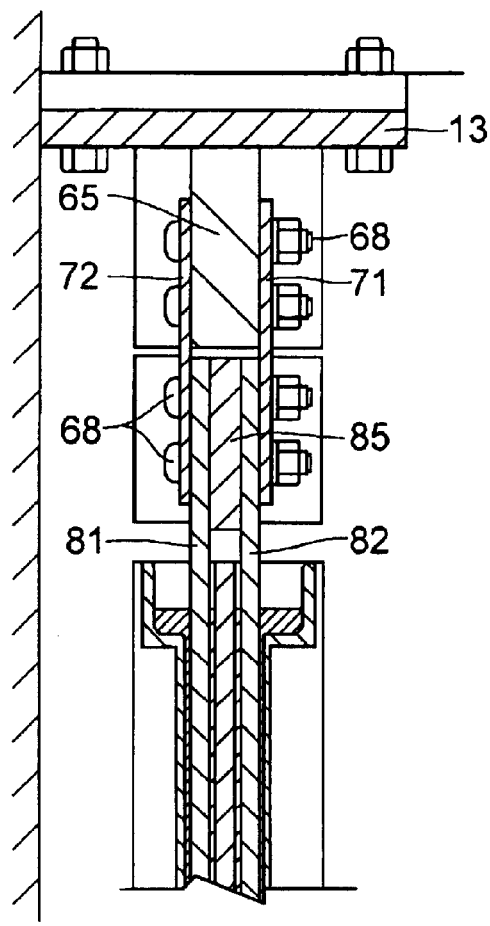
FIG. 25 is an explanatory diagram of still another example of the upper connecting means in the embodiment shown in FIG. 1.

In the case where the resistance plate 18 is constructed by including the two wide resistance plate bodies 81 and 82 opposing each other with the gap 86 therebetween, as shown in FIG. 25, it suffices if the gap holding plate 85 interposed between the resistance plate bodies 81 and 82, as well as the upper splicing plates 71 and 72, are fastened together by the high-strength bolts 68 of the upper connecting means 7.

Further, as for the upper connecting means 7, it is possible to apply construction equivalent to those of the above-described various examples of the lower connecting means 8.

Figure 26:
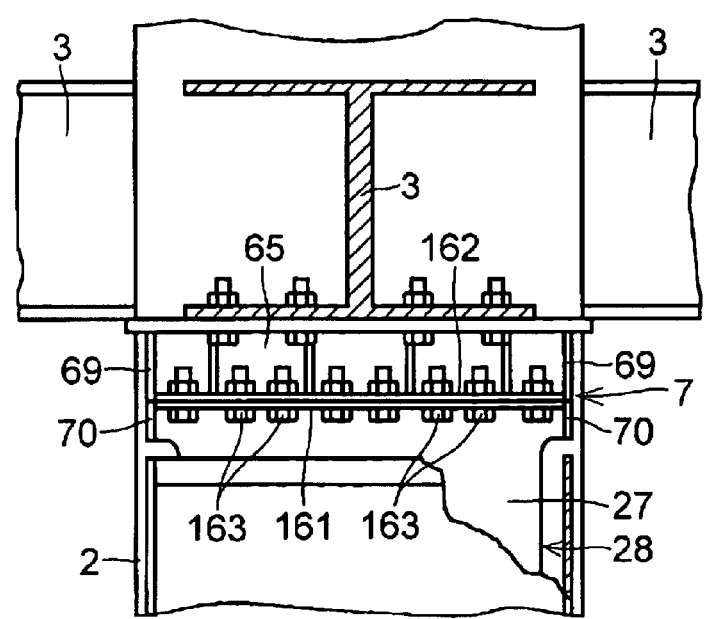
FIG. 26 is an explanatory diagram of a further example of the upper connecting means in the embodiment shown in FIG. 1.

For example, the upper connecting means 7 similar to the lower connecting means 8 shown in FIG. 11 may be embodied as follows: As shown in FIG. 26, the resistance plate 18 is composed of the resistance plate body 27 and an upper horizontal flange 161 secured to an upper edge of the resistance plate body 27 by welding or the like. An upper horizontal flange 162 is secured to a lower edge of the ceiling girder-side gusset plate 65 by welding or the like, and the two upper horizontal flanges 161 and 162 superposed on each other are fastened together by high-strength bolts 163.

Figure 27:
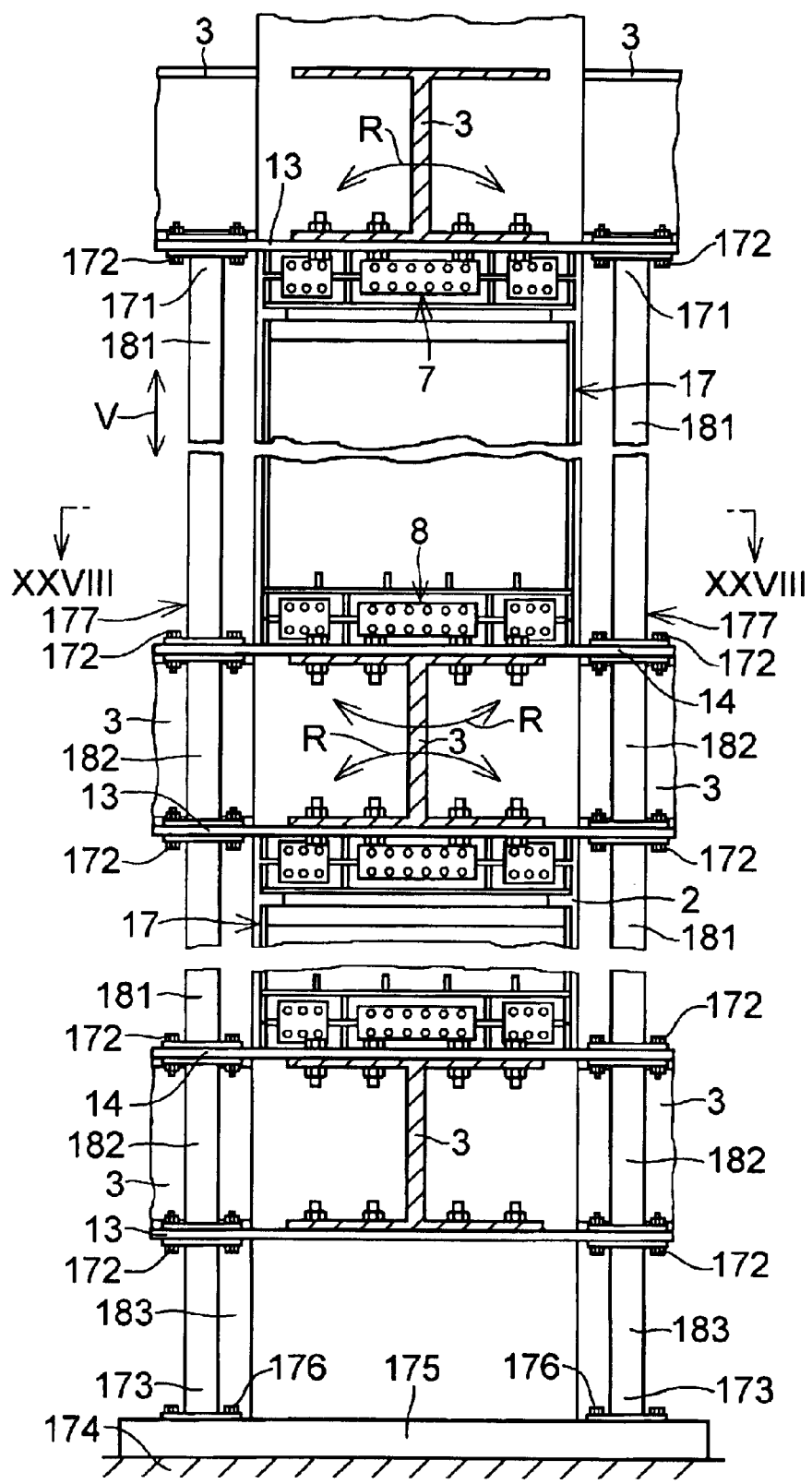
FIG. 27 is an overall diagram of an example in which reinforcing frames are added to the embodiment shown in FIG. 1.
Figure 28:
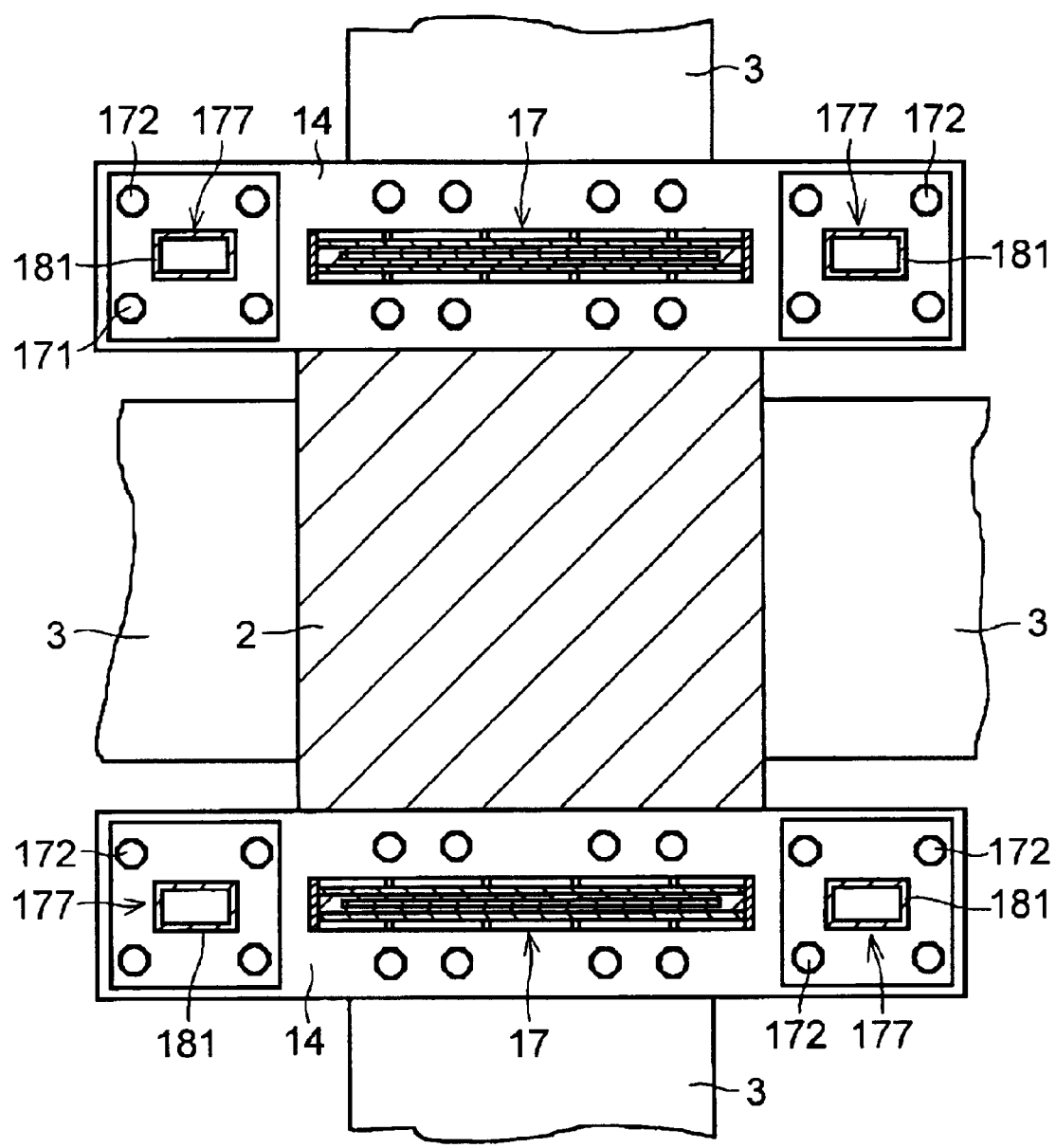
FIG. 28 is a cross-sectional view taken in the direction of arrows along line XXVIII—XXVIII shown in FIG. 27.

In addition, as shown in FIGS. 27 and 28, the building 1 may include two pairs of reinforcing frame means 177 each arranged such that one end portion 171 thereof is fixed to the mounting plate 13 on the ceiling girder 3 side by bolts 172, while the other end portion 173 thereof is fixed to a foundation 175 on the ground 174 by anchor bolts 176, each pair of reinforcing frame means 177 being uprightly provided in the vertical direction V with the box member 17 interposed therebetween.

Each reinforcing frame means 177 in each pair includes reinforcing frames 181 each fixed to the respective mounting plates 13 and 14 on the ceiling girder 3 side and the floor girder 3 side by the bolts 172; reinforcing frames 182 each fixed to the respective mounting plates 13 and 14 by the bolts 172; and a reinforcing frame 183 fixed to the mounting plate 13 on the floor girder 3 side of a lowest floor (on the ceiling girder 3 side as viewed from the ground 174 side) and to the foundation 175 by the bolts 172 and the anchor bolts 176. The reinforcing frames 181, 182, and 183 are respectively formed of rectangular members.

By providing the above-described reinforcing frame means 177, even if angular moment in directions R occurs on the ceiling girder 3 side and the floor girder 3 side due to the deformation of the columns 2 attributable to vibrations caused by an earthquake or the like, the angular moment can be positively received by the reinforcing frame means 177. As a result, it is possible to avoid the shaking of the ceiling girders 3 and the floor girders 3 in the directions R due to the angular moment, and realize the vibration damping performance of the vibration damping means 6 as desired.

What is claimed is:

1. A vibration-damped structure comprising: a column for supporting the vertical load of a structure; a vibration damping means juxtaposed to a side surface of said column; and upper and lower connecting means for connecting said vibration damping means to a ceiling girder side and a floor girder side, respectively, said vibration damping means including a box member having an opening at its upper portion and a bottom wall plate at its lower portion and connected at said bottom wall plate to said floor girder side by means of said lower connecting means; a resistance plate extending in and outside said box member through the opening of said box member and connected at its portion located outside said box member to said ceiling girder side by means of said upper connecting means; and a viscous material filled in a gap between said box member and a portion of said resistance plate located within said box member, and said box member having a pair of wide side wall plates secured to said bottom wall plate, one of said wide side wall plates being disposed such that its wide surface opposes the side surface of said column with a gap.

2. The vibration-damped structure according to claim 1, wherein said lower connecting means includes a box member-side gusset plate secured to said bottom wall plate of said box member; a floor girder-side gusset plate disposed within a vertical plane substantially identical to that of said box member-side gusset plate and secured to the floor girder side; lower splicing plate means disposed in face-to-face relation to said box member-side gusset plate and said floor girder-side gusset plate, respectively; and high-strength bolts for fastening said lower splicing-plate means to both said box member-side gusset plate and said floor girder-side gusset plate.

3. The vibration-damped structure according to claim 2, wherein said lower splicing plate means has at least one pair of lower splicing plates for clamping each of said box member-side gusset plate and said floor girder-side gusset plate, and said pair of lower splicing plates pressingly clamp each of said box member-side gusset plate and said floor girder-side gusset plate by tightening forces of said high-strength bolts.

4. The vibration-damped structure according to claim 3, wherein at least one of said pair of lower splicing plates is formed of a high-friction steel plate disposed such that its high-friction surface is in contact with said box member-side gusset plate and said floor girder-side gusset plate.

5. The vibration-damped structure according to claim 1, wherein said lower connecting means further includes a box member-side gusset plate secured to said bottom wall plate of said box member; a floor girder-side russet plate disposed within a vertical plane substantially identical to that of said box member-side gusset plate and secured to the floor girder side; a pair of lower-side-end upper flange plates respectively secured to horizontal opposite ends of said bottom wall plate of said box member and said box member-side gusset plate and having a vertical length longer than the vertical length of said box member-side gusset plate; and a pair of lower-side-end lower flange plates respectively secured to horizontal opposite ends of said floor girder-side gusset plate and having a vertical length longer than the vertical length of said floor girder-side gusset plate, and a lower end face of said lower-side-end upper flange plate abuts against an upper end face of said corresponding lower-side-end lower flange plate.

6. The vibration-damped structure according to claim 5, wherein said lower connecting means further includes lower-side-end splicing plate means each extending alongside said lower-side-end upper flange plate and said lower-side-end lower flange plate, as well as high-strength bolts for fastening said lower-side-end splicing plate means to both said lower-side-end upper flange plate and said lower-side-end lower flange plate.

7. The vibration-damped structure according to claim 1, wherein said box member has a pair of narrow side wall plates disposed in face-to-face relation to each other in a lateral direction and secured to said bottom wall plate and said wide side wall plates, and said lower connecting means includes a rising plate whose lower edge is secured to the floor girder side; lower-side-end flange plates respectively secured to both ends of said rising plate; a lower-side-end inner splicing plate extending vertically alongside one surface of said narrow side wall plate of said box member and one surface of said lower-side-end flange plate; a lower-side-end outer splicing plate extending vertically alongside another surface of said narrow side wall plate of said box member and another surface of said lower-side-end flange plate; and high-strength bolts for fastening together said lower-side-end inner splicing plate and said lower-side-end outer splicing plate with said narrow side wall plate and said lower-side-end flange plate interposed therebetween.

8. The vibration-damped structure according to claim 7, wherein at least one of said lower-side-end inner splicing plate and said lower-side-end outer splicing plate is formed of a high-friction steel plate whose high-friction surface is in contact with said narrow side wall plate and said lower-side-end flange plate.

9. The vibration-damped structure according to claim 7, wherein said lower connecting means further includes a lower horizontal flange plate superposed on said bottom wall plate of said box member and secured to an upper edge of said rising plate; and high-strength bolts for fastening together said bottom wall plate and said lower horizontal flange plate.

10. The vibration-damped structure according to claim 7, wherein said lower connecting means further includes an auxiliary plate whose one end is secured to said lower-side-end inner splicing plate and which extends alongside an upper surface of said bottom wall plate, as well as a bolt for fixing said auxiliary plate to said bottom wall plate.

11. The vibration-damped structure according to claim 7, wherein notches are respectively formed in said bottom wall plate in a vicinity of one surface of said narrow side wall plate and in said lower horizontal flange plate in a vicinity of one surface of said lower-side-end flange plate, and said lower-side-end inner splicing plate extends vertically through said notches.

12. The vibration-damped structure according to claim 7, wherein a filler plate is interposed in at least one of gaps between said narrow side wall plate and said lower-side-end inner splicing plate, between said lower-side-end flange plate and said lower-side-end inner splicing plate, between said narrow side wall plate and said lower-side-end outer splicing plate, and between said lower-side-end flange plate and said lower-side-end outer splicing plate.

13. The vibration-damped structure according to claim 7, wherein said lower connecting means further includes a lower-side-end gusset plate secured to the other surfaces of said narrow side wall plate and said lower-side-end flange plate.

14. The vibration-damped structure according to claim 13, wherein said lower-side-end gusset plate consists of a two-piece member including a lower-side-end upper gusset plate piece secured to the other surface of said narrow side wall plate as well as a lower-side-end lower gusset plate piece secured to the other surface of said lower-side-end flange plate, said lower-side-end outer splicing plate consists of a pair of lower-side-end outer splicing plate pieces respectively disposed on both sides of said lower-side-end gusset plate, and said lower connecting means further includes a pair of lower outermost-side-end splicing plates which are disposed in such a manner as to sandwich said lower-side-end upper gusset plate piece and said lower-side-end lower gusset plate piece, as well as high-strength bolts for fastening together said pair of lower outermost-side-end splicing plates with said lower-side-end upper gusset plate piece and said lower-side-end lower gusset plate piece interposed therebetween.

15. The vibration-damped structure according to claim 14, wherein said lower-side-end upper gusset plate piece and said lower-side-end lower gusset plate piece respectively have notches formed in their mutually opposing lower and upper edge portions to form a space in a vicinity of a plane of abutment between said bottom wall plate of said box member and said lower horizontal flange plate.

16. The vibration-damped structure according to claim 1, wherein said resistance plate has a wide resistance plate body and a resistance-plate flange plate secured to an upper end of said resistance plate body, and said upper connecting means includes a ceiling girder-side gusset plate secured to the ceiling girder side, a resistance plate-side gusset plate disposed within a vertical plane substantially identical to that of said ceiling girder-side gusset plate and secured to said resistance-plate flange plate, upper splicing plate means disposed in face-to-face relation to said ceiling girder-side gusset plate and said resistance plate-side gusset plate, respectively, and high-strength bolts for fastening said upper splicing-plate means to both said ceiling girder-side gusset plate and said resistance plate-side gusset plate.

17. The vibration-damped structure according to claim 16, wherein said upper splicing-plate means has at least one pair of upper splicing plates for clamping each of said ceiling girder-side gusset plate and said resistance plate-side gusset plate, and said pair of upper splicing plates pressingly clamp each of said ceiling girder-side gusset plate and said resistance plate-side gusset plate by tightening forces of said high-strength bolts.

18. The vibration-damped structure according to claim 1, wherein said resistance plate has a wide resistance plate body, and said upper connecting means includes a ceiling girder-side gusset plate secured to the ceiling girder side, at least one pair of upper splicing plates for clamping each of sad ceiling girder-side gusset plate and an upper portion of said resistance plate body from their both sides, and high-strength bolts for fastening together said pair of upper splicing plates with said ceiling girder-side gusset plate and the upper portion of said resistance plate body interposed therebetween.

19. The vibration-damped structure according to claim 18, wherein at least one of said pair of upper splicing plates is formed of a high-friction steel plate which is disposed with its high-friction surface in contact with said ceiling girder-side gusset plate and the upper portion of said resistance plate body.

20. The vibration-damped structure according to claim 1, wherein said resistance plate has a resistance plate body and an upper flange piece secured to an upper side edge of said resistance plate body, and said upper connecting means includes an upper-side-end flange plate secured to the ceiling girder side, an upper-side-end inner splicing plate extending vertically alongside one surface of said upper-side-end flange plate and one surface of said upper flange piece, an upper-side-end outer splicing plate extending vertically alongside another surface of said upper-side-end flange plate and another surface of said upper flange piece, and high-strength bolts for fastening together said upper-side-end inner splicing plate and said upper-side-end outer splicing plate with said upper-side-end flange plate interposed therebetween, and for fastening together said upper-side-end inner splicing plate and said upper-side-end outer splicing plate with said upper flange piece interposed therebetween.

21. The vibration-damped structure according to claim 20, wherein at least one of said upper-side-end inner splicing plate and said upper-side-end outer splicing plate is formed of a high-friction steel plate whose high-friction surface is in contact with said upper-side-end flange plate and said upper flange piece.

22. The vibration-damped structure according to claim 1, further comprising: a pair of reinforcing frame means each arranged such that one end portion thereof is fixed to the ceiling girder side, while another end portion thereof is fixed to a foundation on the ground, said pair of reinforcing frame means being uprightly provided in the vertical direction with said box member interposed therebetween.

23. The vibration-damped structure according to claim 22, wherein each of said reinforcing frame means includes a reinforcing frame fixed to the ceiling girder side and the floor girder side.

24. The vibration-damped structure according to claim 22, wherein each of said reinforcing frame means has a rectangular member.

* * * * *

UNITED STATES PATENT AND TRADEMARK OFFICE
CERTIFICATE OF CORRECTION

| | |
|---|---|
| PATENT NO. | : 6,840,017 B1 |
| APPLICATION NO. | : 10/168799 |
| DATED | : January 11, 2005 |
| INVENTOR(S) | : Shimoda et al. |

It is certified that error appears in the above-identified patent and that said Letters Patent is hereby corrected as shown below:

Title page, column 1, Item 54 and column 1, first line (title), delete "VIBRATION CONTROL STRUCTURE" AND INSERT --VIBRATION-DAMPED STRUCTURE--.

On the Title page item (56), line 4, column 2, under heading FOREIGN PATENT DOCUMENTS "11-2229632" should read --11-229632-- and line 11, "00-74362" should read --00-14362--.

Column 17, claim 5, line 4, delete "russet" and insert --gusset--.

Signed and Sealed this

Eighth Day of May, 2007

JON W. DUDAS
*Director of the United States Patent and Trademark Office*